(12) United States Patent
Arahira

(10) Patent No.: US 7,133,581 B2
(45) Date of Patent: Nov. 7, 2006

(54) OPTICAL SWITCH

(75) Inventor: Shin Arahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/181,753

(22) Filed: Jul. 15, 2005

(65) Prior Publication Data

US 2006/0039642 A1    Feb. 23, 2006

(30) Foreign Application Priority Data

Aug. 19, 2004   (JP) ............... 2004-239054

(51) Int. Cl.
  *G02B 6/35*   (2006.01)
  *G02B 6/27*   (2006.01)
(52) U.S. Cl. .......................... 385/11; 385/16
(58) Field of Classification Search ............... None
  See application file for complete search history.

(56) References Cited

U.S. PATENT DOCUMENTS 6,587,608 B1 *  7/2003  Cormack .................. 385/16
6,870,974 B1 *  3/2005  Watanabe ................. 385/11
6,963,675 B1 *  11/2005  Watanabe ................. 385/11

OTHER PUBLICATIONS

"Ultrafast optical multi/demultiplexer utilizing optical Kerr effect in polarization-maintaining single-mode fibres", T. Morioka et al., Electronic Letters, vol. 23, No. 9, pp. 453-454, Apr. 1987.

* cited by examiner

*Primary Examiner*—John D. Lee
*Assistant Examiner*—Jerry T Rahll
(74) *Attorney, Agent, or Firm*—Rabin & Berdo P.C.

(57) ABSTRACT

The present invention provides an optical switch whose operational characteristics do not change, and which is not affected by polarization cross talk, even when the wavelength of a signal light or the ambient temperature of the optical switch varies. The optical switch comprises first and second polarization splitting/combining modules, (10,18), first and second polarization-maintaining single-mode fibers (12, 16), a first polarization plane conversion portion (14), third and fourth polarization-maintaining single-mode fibers (22, 26), and a second polarization plane conversion portion (24).

13 Claims, 6 Drawing Sheets

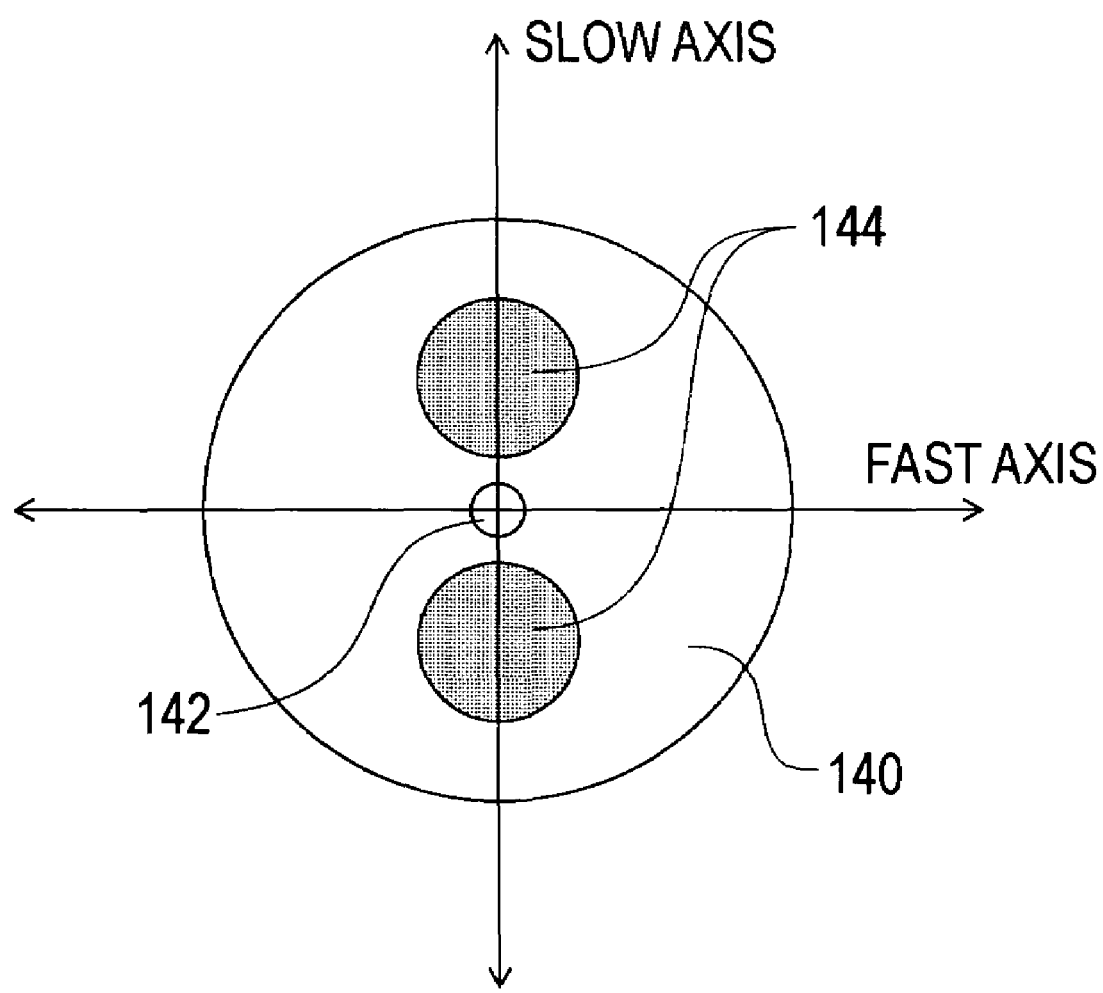

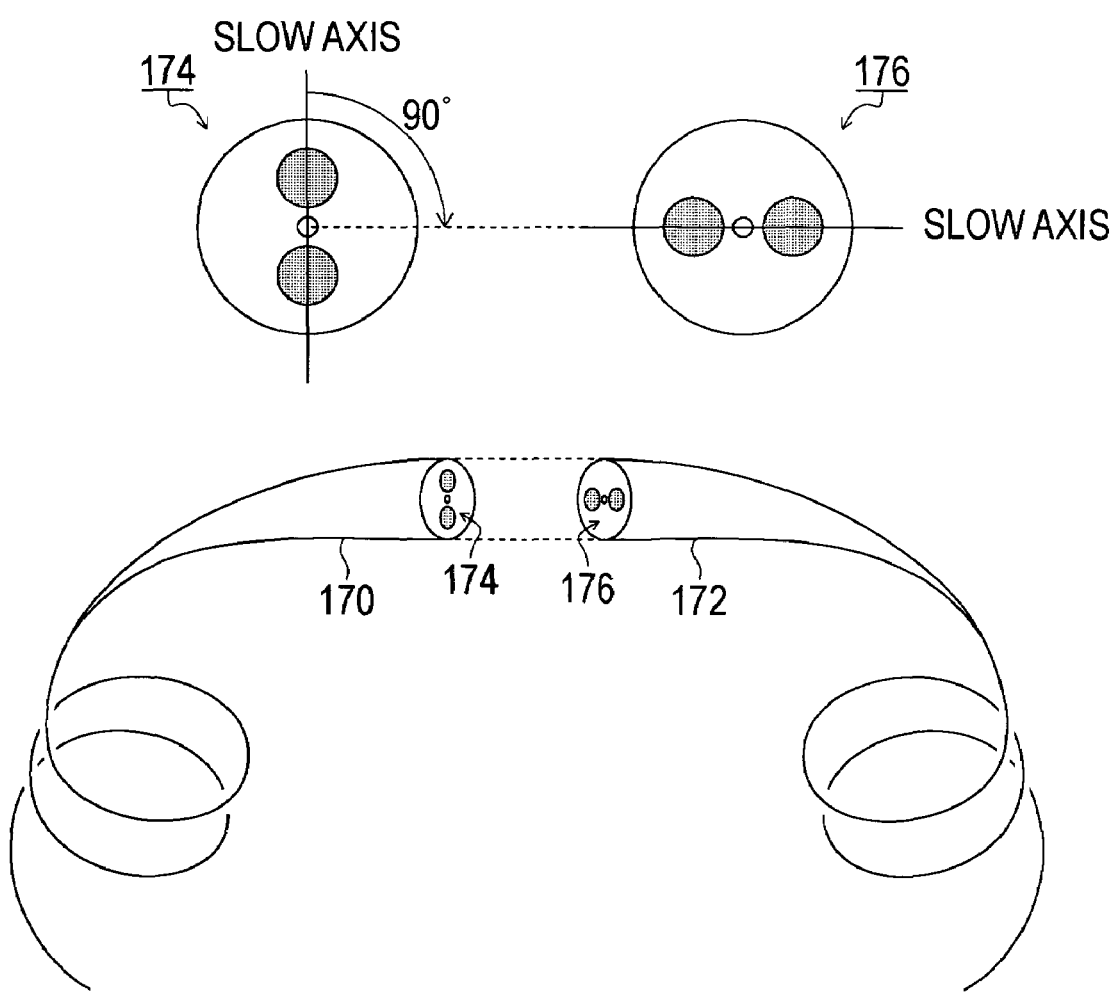

OPTICAL SWITCH

BACKGROUND OF THE INVENTION

1. Field of the Invention

The present invention relates to an optical switch used in long-distance, large capacity optical fiber communication and the like for switching a controlled light using a control light.

2. Description of Related Art

To realize large capacity optical fiber communication using limited communication line resources effectively, means for increasing the number of channels capable of transmission and reception and means for increasing the communication speed must be provided.

Multiplex communication methods such as time division multiplexing (TDM) are under investigation as such means for increasing the number of channels. TDM is a communication method in which multiplexing/demultiplexing means are used to time-multiplex a plurality of channels (tributary channels), transmit the time-multiplexed channels as a time-division multiplex signal, and then divide the time division multiplex signal into the individual channels (tributary channels) on the reception side by means of a gate signal generated from a clock signal in order to extract and receive the information in the individual channels.

To increase the communication speed of the TDM described above, it is desirable that all of the multiplexing/demultiplexing means be realized by optical means. In other words, it is desirable to realize an optical switch which is capable of executing a switching operation for transmitting or blocking an optical pulse constituting an optical pulse signal, which is a controlled light, using only an optical control signal serving as a control light, rather than electrical means.

The optical Kerr effect that occurs in optical fiber is a phenomenon by which the refractive index of an optical fiber is altered when light of high intensity propagates through the optical fiber. The reaction rate of the optical Kerr effect is several femto-seconds (fs). In other words, if an optical switch is constituted using the optical Kerr effect, an optical switch that is capable of switching optical pulse signals at several hundred Gbit/s or more can be realized. By comparison, a conventional switch, in which an optical pulse signal is first converted into an electric pulse signal serving as an electrical signal, whereupon the electric pulse signal is switched by an electronic device and then returned to an optical pulse signal, is capable of switching an optical pulse signal at a maximum bit rate of approximately 40 Gbit/s.

An optical switch which utilizes the optical Kerr effect generated in a polarization-maintaining single-mode fiber is under investigation as an optical switch utilizing the optical Kerr effect (see "Ultrafast optical multi/demultiplexer utilising optical Kerr effect in polarisation-maintaining single-mode fibres", T. Morioka, M. Saruwatari, and A. Takada, Electronic Letters, vol. 23, No. 9, pp. 453–454, April 1987, for example).

The optical switch utilizing the optical Kerr effect disclosed in "Ultrafast optical multi/demultiplexer utilising optical Kerr effect in polarisation-maintaining single-mode fibres", T. Morioka, M. Saruwatari, and A. Takada, Electronic Letters, vol. 23, No. 9, pp. 453–454, April 1987 employs polarization-maintaining single-mode fiber (also referred to hereafter simply as "optical fiber") as optical fiber for generating the optical Kerr effect. Polarization-maintaining single-mode fiber is constituted such that the effective index in relation to light guided therethrough differs between an optical axis direction known as the slow axis, which is set on a perpendicular plane to the propagation direction of light through the fiber (also referred to as the "optical axis direction of the optical fiber" hereafter), and an optical axis direction known as the fast axis, which is orthogonal to the slow axis.

In other words, a stress-applying portion having a higher refractive index than the refractive index of the cladding, is placed in the vicinity of the core of the optical fiber such that the effective index in relation to light in which the vibration direction of the electric field vector of the light is parallel to the slow axis direction is higher than the effective index in relation to light in which the vibration direction of the electric field vector of the light is parallel to the fast axis direction. As a result of this asymmetry in the effective index, light input into the polarization-maintaining single-mode fiber is propagated with a maintained polarization plane. Hereafter, the vibration plane of the electric field vector of linearly polarized light will also be referred to as the polarization plane.

The optical fiber used in the optical switch disclosed in "Ultrafast optical multi/demultiplexer utilising optical Kerr effect in polarisation-maintaining single-mode fibres", T. Morioka, M. Saruwatari, and A. Takada, Electronic Letters, vol. 23, No. 9, pp. 453–454, 1987 has a plane formed by fusing two polarization-maintaining single-mode fibers such that the optical axes thereof are orthogonal, and is constituted such that the birefringence of the polarization-maintaining single-mode fiber can be canceled out. The optical switch is input with a linearly polarized control light having a parallel polarization plane to the optical axis of the polarization-maintaining single-mode fiber, and a linearly polarized signal light having a polarization plane inclined by 45 degrees from the optical axis of the polarization-maintaining single-mode fiber.

When an optical pulse constituting a signal light and an optical pulse constituting a control light are not input into the optical switch in synchronization, the signal light optical pulse is output in the same linearly polarized state as it was when input into the optical switch. On the other hand, when a control light optical pulse and a signal light optical pulse are input in synchronization, the control light optical pulse causes the optical Kerr effect to be generated on the polarization component of the signal light optical pulse that is parallel to the polarization direction of the control light optical pulse. In other words, the optical Kerr effect produces a phase shift in the signal light optical pulse due to a mutual phase modulation effect generated between the signal light optical pulse and control light optical pulse.

This phase shift $\phi$ is obtained using the following equation (1).

$$\phi = 2\gamma PL \qquad (1)$$

Here, P(W) is the power of the control light, and L(km) is the length of the optical fiber constituting an optical fiber loop. $\gamma(W^{-1}km^{-1})$ is a nonlinear optical constant based on the optical Kerr effect. The value of $\gamma(W^{-1}km^{-1})$ in relation to normal optical fiber is approximately 1 to 2 $W^{-1}km^{-1}$, but special optical fiber known as highly nonlinear optical fiber, having a reduced effective sectional area such that the value of $\gamma(W^{-1}km^{-1})$ is approximately several ten to several hundred $W^{-1}km^{-1}$, is also under development.

When the phase shift amount $\phi$ is equal to $\pi$, the polarization direction of the signal light optical pulse rotates 90 degrees from the time of input into the optical switch. In other words, the polarization direction of the signal light optical pulse is −45 degrees from the optical axis of the optical fiber. By disposing an analyzer at the output side of the optical switch, the signal light optical pulse can be transmitted or blocked by means of the control light. More specifically, by setting the optical axis direction of the analyzer such that the signal light optical pulse is transmitted when the polarization direction thereof is rotated 90 degrees from the time of input into the optical switch and blocked when the polarization direction thereof is identical to the polarization direction at the time of input, only optical pulses whose polarization direction has been rotated by the control light can be transmitted through the optical switch, and thus the signal light optical pulse can be switched by the control light.

To ensure that the switching operation described above is performed reliably, a prerequisite of the optical switch disclosed in "Ultrafast optical multi/demultiplexer utilising optical Kerr effect in polarisation-maintaining single-mode fibres", T. Morioka, M. Saruwatari, and A. Takada, Electronic Letters, vol. 23, No. 9, pp. 453–454, 1987 is that the respective polarization states of the signal light optical pulse and control light optical pulse are maintained during propagation through the polarization-maintaining single-mode fiber. In this optical switch, the polarization states of the optical pulses are maintained substantially by providing a constitution (also referred to as "fused portion") in which polarization-maintaining single-mode fibers are fused so as to have orthogonal optical axes in an intermediate position in the optical axis direction of the polarization-maintaining single-mode fiber.

To describe more specifically the manner in which the polarization state of the optical pulses is substantially maintained, first a first stage polarization-maintaining single-mode fiber extending from the entrance terminal of the polarization-maintaining single-mode fiber to the fused portion, and a second stage polarization-maintaining single-mode fiber extending from the fused portion to the exit terminal of the polarization-maintaining single-mode fiber, are provided. Then, a linearly polarized light having a polarization plane that is inclined 45 degrees from the optical axis of the first stage polarization-maintaining single-mode fiber is input. The components of the input light that are parallel to the fast axis and slow axis of the first stage polarization-maintaining single-mode fiber at this time are defined as an S component and a P component respectively. The phase difference that occurs between the S component and P component of the input light in the first stage polarization-maintaining single-mode fiber is set as $\phi$.

Thus the polarization-maintaining single-mode fiber constituting this optical switch is designed such that the phase difference which occurs between the S component and P component of the input light in the second stage polarization-maintaining single-mode fiber becomes $-\phi$. In other words, the fused portion described above is provided on the path taken by the signal light from the input terminal of the first stage polarization-maintaining single-mode fiber, which is the input terminal of the optical switch, to the analyzer, in a position in which the optical path length (a value obtained by multiplying the refractive index by the geometrical length) when the signal light is input onto the path as TM polarization matches the optical path length when the signal light is input as TE polarization.

Hence, to realize the operation described above, the first stage polarization-maintaining single-mode fiber and second stage polarization-maintaining single-mode fiber must have an identical constitution, and the length of the first stage polarization-maintaining single-mode fiber must be set equally to the length of the second stage polarization-maintaining single-mode fiber.

In PANDA (polarization-maintaining AND absorption-reducing) optical fiber, which is used widely as polarization-maintaining single-mode fiber, the difference between the effective index when the vibration direction of the electric field vector of the guided light is parallel to the fast axis and the effective index when the vibration direction of the electric field vector of the guided light is parallel to the slow axis is approximately $3\times10^{-4}$. Hence, if the wavelength of the guided optical pulse is 1.5 μm, for example, a phase difference of $2\pi$ is generated between the component in which the vibration direction of the electric field vector is parallel to the fast axis and the component in which the vibration direction of the electric field vector is parallel to the slow axis by propagating an optical pulse approximately 5 mm through the polarization-maintaining single-mode fiber.

In other words, if the difference between the length of the first stage polarization-maintaining single-mode fiber and the length of the second stage polarization-maintaining single-mode fiber cannot be set sufficiently below 5 mm, the polarization state of the optical pulse propagating through the polarization-maintaining single-mode fiber cannot be substantially maintained.

The length of the optical fiber used in this type of optical switch is typically between several tens of meters and several hundred kilometers, and it is therefore extremely difficult to set the entire length of such an optical fiber with an accuracy of millimeters or less. Moreover, if the difference between the length of the first stage polarization-maintaining single-mode fiber and the length of the second stage polarization-maintaining single-mode fiber is not set to a sufficiently small value, it becomes impossible to maintain the characteristics of the optical switch in the face of variation in the ambient temperature of the optical switch and the wavelength of the signal light or control light.

Moreover, the fast axis (or slow axis) direction of a polarization-maintaining single-mode fiber such as a commercially available PANDA optical fiber is not always completely unchanging in the length direction thereof. Therefore, even when an input light input into the polarization-maintaining single-mode fiber is a linearly polarized wave having a polarization plane that is parallel to the fast axis (or slow axis) of the polarization-maintaining single-mode fiber, the output light that is output from the polarization-maintaining single-mode fiber comprises a polarization component that is orthogonal to the polarization direction of the input light. This component having an orthogonal polarization direction to the polarization direction of the input light is known as polarization cross talk.

It is known that in commercially available PANDA optical fiber having an average polarization-maintaining capability, this polarization cross talk increases dramatically when the length of the PANDA optical fiber increases beyond several tens of meters (see "Polarization Maintaining Fiber", Arai, Saito, Koyama, Nakamura, Yokomizo, Aiso, Furukawa Electric Information No. 109, pp. 5–10, January 2002, for example).

As described above, an optical switch utilizing the optical Kerr effect is typically constituted with polarization-maintaining single-mode fiber of several tens of meters or more, and therefore considerable attention must be paid to polarization cross talk during design. An optical pulse propagating through the polarization-maintaining single-mode fiber constituting the optical switch comprises polarization components in both the fast axis and slow axis directions. Hence, if polarization cross talk occurs, the polarization cross talk interferes with the original polarization direction components of the signal light optical pulse such that the polarization state of the signal light optical pulse differs from a case in which polarization cross talk does not exist. The effect of this polarization cross talk on the signal light optical pulse also varies according to variation in the wavelength of the signal light optical pulse, the ambient temperature of the polarization-maintaining single-mode fiber, and soon. In other words, polarization cross talk causes variation in the operating characteristics of the optical switch, which leads to instability in the switching operation.

It is therefore an object of the present invention to provide an optical switch capable of realizing a stable operation, whose the operating characteristics are not altered, and which is not affected by polarization cross talk, even when the wavelength of a signal light serving as a controlled light and the ambient temperature of the optical switch vary.

SUMMARY OF THE INVENTION

To achieve this object, an optical switch of the present invention comprises a first polarization splitting/combining module, a second polarization splitting/combining module, a first polarization-maintaining single-mode fiber, a second polarization-maintaining single-mode fiber, a first polarization plane conversion portion, a third polarization-maintaining single-mode fiber, a fourth polarization-maintaining single-mode fiber, and a second polarization plane conversion portion.

The first polarization splitting/combining module comprises a first input/output terminal for inputting a signal light, a second input/output terminal on the opposite side of the first input/output terminal, to which one end of the first polarization-maintaining single-mode fiber is connected, and a third input/output terminal for outputting a switched signal light.

The second polarization splitting/combining module comprises a first input/output terminal to which the other end of the second polarization-maintaining single-mode fiber is connected, a second input/output terminal on the opposite side of the first input/output terminal, to which one end of the third polarization-maintaining single-mode fiber is connected, a third input/output terminal to which one end of the fourth polarization-maintaining single-mode fiber is connected, and a fourth input/output terminal on the opposite side of the third input/output terminal, for outputting a polarization cross talk component.

The one end of the first polarization-maintaining single-mode fiber is connected to the second input/output terminal of the first polarization splitting/combining module, and the other end of the second polarization-maintaining single-mode fiber is connected to the first input/output terminal of the second polarization splitting/combining module. The other end of the first polarization-maintaining single-mode fiber and the one end of the second polarization-maintaining single-mode fiber are connected to each other via the first polarization plane conversion portion.

The third polarization-maintaining single-mode fiber comprises an optical coupler, and the one end thereof is connected to the second input/output terminal of the second polarization splitting/combining module. The one end of the fourth polarization-maintaining single-mode fiber is connected to the third input/output terminal of the second polarization splitting/combining module. The other end of the third polarization-maintaining single-mode fiber and the other end of the fourth polarization-maintaining single-mode fiber are connected to each other via the second polarization plane conversion portion.

First, when light enters a reflection surface having polarization plane selectivity (also referred to hereafter as "polarization plane selective reflection surface) of the polarization splitting/combining element constituting the first polarization splitting/combining module, the components of the incident light corresponding to the vibration direction of the electric field vector on the polarization plane selective reflection surface are defined as follows. The component having an electric field vector which vibrates in a parallel direction to the plane of incidence of the incident light on the polarization plane selective reflection surface of the polarization splitting/combining element is referred to as a p component, and the component having an electric field vector which vibrates in a perpendicular direction to the plane of incidence of the incident light is referred to as an s component.

According to the optical switch of the present invention, the linearly polarized signal light serving as an input signal light input into the optical switch is input into the first input/output terminal of the first polarization splitting/combining module, and output from the second input/output terminal of the first polarization splitting/combining module with its polarization plane maintained.

To operate the optical switch in this manner, the polarization direction of the input signal light is set in the following manner. First, the linearly polarized signal light serving as an input signal light input into the optical switch is input into the first input/output terminal of the first polarization splitting/combining module as a p-polarized light. The polarization plane selective reflection surface of the polarization splitting/combining element transmits only the p component, and reflects only the s component, and therefore the signal light, which is input into the first input/output terminal of the first polarization splitting/combining module as a p-polarized light, is output from the second input/output terminal of the first polarization splitting/combining module, disposed on the opposite side of the first input/output terminal, while remaining as a p-polarized light.

Having been output from the second input/output terminal of the first polarization splitting/combining module, the signal light is input into the one end of the first polarization-maintaining single-mode fiber and propagated therethrough such that the polarization plane of the signal light matches the optical axis of the first polarization-maintaining single-mode fiber. The signal light then reaches and passes through the first polarization plane conversion portion, disposed on the other end of the first polarization-maintaining single-mode fiber, and is input into the one end of the second polarization-maintaining single-mode fiber.

The first polarization plane conversion portion is formed by fusing the first polarization-maintaining single-mode fiber and second polarization-maintaining single-mode fiber such that the respective optical axes thereof form an angle of 45 degrees in relation to each other, for example. Hence, as will be described in detail hereafter, having passed through the first polarization plane conversion portion, the signal light propagates through the second polarization-maintaining single-mode fiber in a polarization state having an electric field vector component that is parallel to the optical axis of the second polarization-maintaining single-mode fiber and an electric field vector that is perpendicular thereto. In this state, the signal light is input into the first input/output terminal of the second polarization splitting/combining module. Having been input into the second polarization splitting/combining module through the first input/output terminal of the second polarization splitting/combining module, the signal light is divided into a first signal light and a second signal light having orthogonal polarization planes, whereupon the first and second signal lights are output from the second input/output terminal and third input/output terminal of the second polarization splitting/combining module, respectively.

The first signal light is input through the one end of the third polarization-maintaining single-mode fiber, and propagates thus through the third polarization-maintaining single-mode fiber. The first signal light then passes through the second polarization plane conversion portion, provided on the other end of the third polarization-maintaining single-mode fiber, and is input into the fourth polarization-maintaining single-mode fiber. The second polarization plane conversion portion is formed by fusing the third polarization-maintaining single-mode fiber and fourth polarization-maintaining single-mode fiber such that the respective optical axes thereof form an angle of 90 degrees in relation to each other, for example. Therefore, when the first signal light has propagated through the third polarization-maintaining single-mode fiber, the polarization plane thereof is rotated 90 degrees, whereupon the first signal light is input into the fourth polarization-maintaining single-mode fiber. Having propagated through the fourth polarization-maintaining single-mode fiber in this manner, the first signal light is input into the third input/output terminal of the second polarization splitting/combining module.

Meanwhile, the second signal light is output from the third input/output terminal of the second polarization splitting/combining module, input through the one end of the fourth polarization-maintaining single-mode fiber, propagates through the fourth polarization-maintaining single-mode fiber, passes through the second polarization plane conversion portion provided on the other end of the fourth polarization-maintaining single-mode fiber, and is input into the third polarization-maintaining single-mode fiber. Similarly to the first signal light, the polarization plane of the second signal light is rotated 90 degrees in the second polarization plane conversion portion following propagation through the fourth polarization-maintaining single-mode fiber, and the second signal light is thus input into the third polarization-maintaining single-mode fiber. Having propagated through the third polarization-maintaining single-mode fiber, the second signal light is input into the second input/output terminal of the second polarization splitting/combining module.

Here, the polarization plane direction of the second signal light upon input into the second input/output terminal of the second polarization splitting/combining module matches the polarization plane direction of the first signal light upon output to the second input/output terminal of the second polarization splitting/combining module, from the signal light that is input into the second polarization splitting/combining module through the first input/output terminal of the second polarization splitting/combining module. Further, the polarization plane direction of the first signal light upon input into the third input/output terminal of the second polarization splitting/combining module matches the polarization plane direction of the second signal light upon output to the third input/output terminal of the second polarization splitting/combining module, from the signal light that is input into the second polarization splitting/combining module through the first input/output terminal of the second polarization splitting/combining module.

Hence, after the second signal light and first signal light have been combined in the second polarization splitting/combining module, the signal light propagates from the second polarization-maintaining single-mode fiber toward the first polarization-maintaining single-mode fiber, i.e. in the opposite direction to that in which the signal light was input, in exactly the same polarization state as that in which the signal light was input toward the second polarization splitting/combining module. The signal light is then input through the second input/output terminal of the first polarization splitting/combining module, and output from the first input/output terminal on the opposite side of the second input/output terminal.

Hence, the linearly polarized signal light input into the first input/output terminal of the first polarization splitting/combining module is output in the same polarization state as that in which it is input through the first input/output terminal of the first polarization splitting/combining module. In other words, it may be considered that the signal light input into the optical switch is reflected and then output from the first input/output terminal of the first polarization splitting/combining module. Accordingly, a signal light that is output from the first input/output terminal of the first polarization splitting/combining module will be referred to hereafter as loop reflection light.

Next, a case in which a control light is input through the optical coupler provided on the third polarization-maintaining single-mode fiber will be considered. In this case, the phase velocity of the first signal light propagating through the third polarization-maintaining single-mode fiber is altered. By adjusting the length of the third polarization-maintaining single-mode fiber according to the intensity of the control light and comparing cases in which the control light is present and absent when the first signal light finishes propagating through the third polarization-maintaining single-mode fiber, the resulting phase difference can be set exactly to $\pi$.

As will be described in detail hereafter, by performing such setting, once the second signal light and first signal light have been combined in the second polarization splitting/combining module, the signal light passes through the first polarization plane conversion portion while propagating from the second polarization-maintaining single-mode fiber toward the first polarization-maintaining single-mode fiber. The signal light then propagates through the first polarization-maintaining single-mode fiber as an output signal light having an orthogonal polarization plane to the polarization plane direction of the input signal light of the optical switch when passing through the first polarization plane conversion portion while propagating from the first polarization-maintaining single-mode fiber toward the second polarization-maintaining single-mode fiber. The output signal light is input through the second input/output terminal of the first polarization splitting/combining module, and output from the third input/output terminal. Hereafter, a signal light which is output from the third input/output terminal of the first polarization splitting/combining module in this manner will also be referred to as loop transmission light.

As described above, in the optical switch of the present invention, the first signal light and second signal light travel along a common path, and therefore an optical switch that is ensured of stable operations, and whose operational characteristics do not change even when the wavelength of the signal light and the ambient temperature of the optical switch vary, can be realized.

In this optical switch, polarization cross talk occurs mainly in the third polarization-maintaining single-mode fiber, which has the greatest fiber length. The polarization crosstalk component that is mixed into the first signal light has an orthogonal polarization direction to the polarization direction of the first signal light, and therefore, as will be described in detail hereafter, the polarization cross talk component is output from the fourth input/output terminal of the second polarization splitting/combining module following input through the third input/output terminal thereof. As a result, this component is not included in the loop transmission light that is output from the third input/output terminal of the first polarization splitting/combining module. The polarization cross talk component that is mixed into the second signal light has an orthogonal polarization direction to the polarization direction of the second signal light, and therefore, this polarization cross talk component is also output from the fourth input/output terminal of the second polarization splitting/combining module following input through the second input/output terminal thereof. As a result, this component is not included in the loop transmission light that is output from the third input/output terminal of the first polarization splitting/combining module.

Hence, according to the optical switch of the present invention, polarization cross talk components do not affect the switching operation, even when the length of the third polarization-maintaining single-mode fiber is great. In other words, an optical switch that is ensured of stable operations, and which is not affected by polarization crosstalk, is realized.

BRIEF DESCRIPTION OF THE DRAWINGS

The foregoings and other objects, features and advantageous of the present invention will be better understood from the following description taken in connection with the accompanying drawings, in which:

FIG. 2 is a schematic sectional view of a polarization-maintaining single-mode fiber;

FIG. 3 is a view illustrating the structure of a polarization plane conversion portion;

DESCRIPTION OF THE PREFERRED EMBODIMENTS

Figure 1:
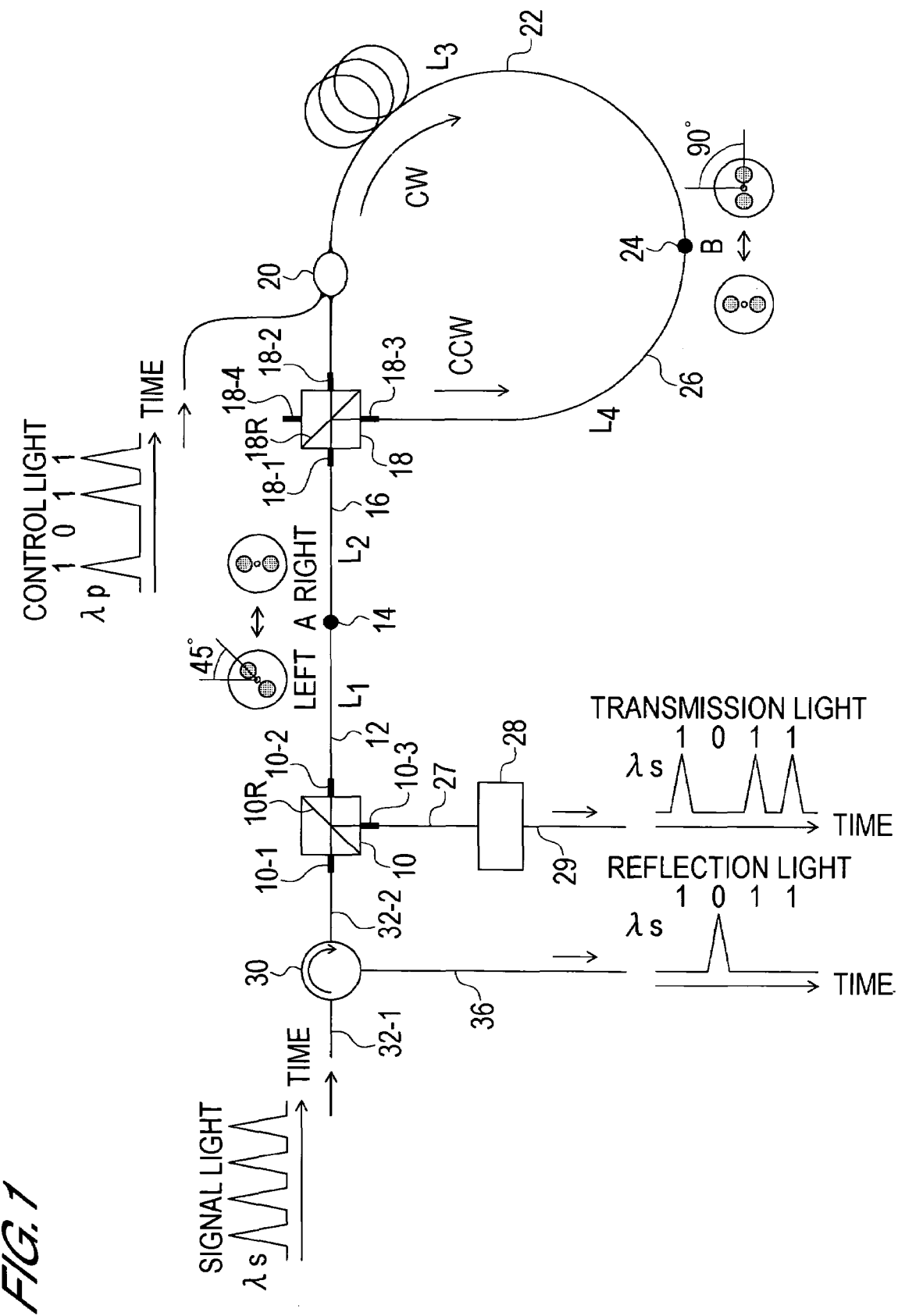
FIG. 1 is a block diagram of an optical switch according to a first embodiment of the present invention.

Embodiments of the present invention will be described below with reference to the drawings. Note that each drawing illustrates a constitutional example relating to the present invention. The disposal relationships and so on between each constitutional element are merely illustrated in outline to aid understanding of the present invention, and the present invention is not limited to the illustrated examples. Further, in the following description, specific instruments, conditions, and so on are sometimes used, but these materials and conditions are merely preferred examples, and the present invention is not limited thereto. In each drawing, identical constitutional elements have been allocated identical reference numbers, and duplicate description thereof may be omitted.

[First Embodiment]

The structure and operation of an optical switch serving as a first embodiment will now be described with reference to FIG. 1.

(Structure)

The optical switch comprises a first polarization splitting/combining module 10, a second polarization splitting/combining module 18, a first polarization-maintaining single-mode fiber 12, a second polarization-maintaining single-mode fiber 16, a first polarization plane conversion portion 14, a third polarization-maintaining single-mode fiber 22, a fourth polarization-maintaining single-mode fiber 26, and a second polarization plane conversion portion 24.

The first polarization splitting/combining module 10 comprises a first input/output terminal 10-1 to which one end of an input optical fiber 32-2 for inputting a signal light is connected, a second input/output terminal 10-2 provided on the opposite side of the first input/output terminal 10-1, to which one end of the first polarization-maintaining single-mode fiber 12 is connected, and a third input/output terminal 10-3 for outputting a switched signal light.

The second polarization splitting/combining module 18 comprises a first input/output terminal 18-1 to which the other end of the second polarization-maintaining single-mode fiber 16 is connected, a second input/output terminal 18-2 provided on the opposite side of the first input/output terminal 18-1, to which one end of the third polarization-maintaining single-mode fiber 22 is connected, a third input/output terminal 18-3 to which one end of the fourth polarization-maintaining single-mode fiber 26 is connected, and a fourth input/output terminal 18-4 provided on the opposite side of the third input/output terminal 18-3 for outputting a polarization cross talk component.

The one end of the first polarization-maintaining single-mode fiber 12 is connected to the second input/output terminal 10-2 of the first polarization splitting/combining module 10, and the other end of the second polarization-maintaining single-mode fiber 16 is connected to the first input/output port 18-1 of the second polarization splitting/combining module 18. The other end of the first polarization-maintaining single-mode fiber 12 and one end of the second polarization-maintaining single-mode fiber 16 are connected to each other via the first polarization plane conversion portion 14 (provided in a position indicated by A in FIG. 1).

The third polarization-maintaining single-mode fiber 22 comprises an optical coupler 20, and the one end thereof is connected to the second input/output terminal 18-2 of the second polarization splitting/combining module 18. The one end of the fourth polarization-maintaining single-mode fiber 26 is connected to the third input/output terminal 18-3 of the second polarization splitting/combining module 18. The other end of the third polarization-maintaining single-mode fiber 22 and the other end of the fourth polarization-maintaining single-mode fiber 26 are connected to each other via the second polarization plane conversion portion 24 (provided in a position indicated by B in FIG. 1).

The PANDA optical fiber shown in FIG. 2 is a representative example of a polarization-maintaining single-mode fiber that can be employed favorably as the first through fourth polarization-maintaining single-mode fibers. This optical fiber is formed with a stress-applying portion in the vicinity of the core such that intense stress is applied to the core, thereby realizing a polarization-maintaining characteristic.

FIG. 2 shows the schematic constitution of a cross-section of the PANDA optical fiber serving as polarization-maintaining single-mode fiber, severed perpendicular to the light propagation direction. A stress-applying portion 144 is formed in cladding 140 surrounding a core 142 through which light is guided so as to sandwich the core 142. For example, the cladding 140 is formed from $SiO_2$, the core 142 is formed from $SiO_2$ doped with $GeO_2$, and the stress-applying portion 144 is formed from $SiO_2$ doped with $B_2O_3$.

By forming the optical fiber in this manner, the effective index in relation to the light guided through the core 142 differs in FIG. 2 between the slow axis direction set on a perpendicular plane to the light propagation direction of the PANDA optical fiber, and the fast axis direction which is orthogonal to the slow axis. In other words, the stress-applying portion, which has a higher refractive index than the refractive index of the cladding 140, is placed in the vicinity of the core 142, and therefore the effective index in relation to light in which the vibration direction of the electric field vector of the light is parallel to the slow axis direction is higher than the effective index in relation to light in which the vibration direction of the electric field vector of the light is parallel to the fast axis direction. As a result of this asymmetry in the effective index, light input into the PANDA optical fiber is propagated with a maintained polarization plane.

In other words, with PANDA optical fiber, when the polarization plane of a linearly polarized light is input in accordance with the slow axis (or fast axis) shown in FIG. 2, the light is propagated through the PANDA optical fiber while maintaining its polarization state, and even at the exit terminal, it is possible to obtain only a linearly polarized light component whose polarization plane matches the slow axis (or fast axis)

For ease of description, in the block diagram of the optical switch shown in FIG. 1, the polarization direction of the light that is propagated through the polarization-maintaining single-mode fiber serving as an optical transmission line is prescribed as follows. Polarized light in which the vibration direction of the electric field vector of the light is perpendicular to the paper surface in FIG. 1 is denoted as TE (transverse-electric modes) polarization, and the perpendicular direction to the paper surface is denoted as the TE direction. Further, polarized light in which the vibration direction of the electric field vector of the light is parallel to the paper surface is denoted as TM (transverse-magnetic modes) polarization, and the parallel direction to the paper surface is denoted as the TM direction. Needless to say, the scope of usage of the optical switch of the present invention is not limited to such a case.

Also in the following description, when light enters a polarization splitting/combining module such as the first polarization splitting/combining module 10, the components of the incident light corresponding to the vibration direction of the electric field vector on the polarization plane selective reflection surface of the polarization splitting/combining module are defined as follows. That is, the component of the incident light on the polarization plane selective reflection surface having an electric field vector which vibrates in a parallel direction to the plane of incidence will be referred to as a p component, and the component of the incident light having an electric field vector which vibrates in a perpendicular direction to the plane of incidence will be referred to as an s component.

For example, when light enters the first polarization splitting/combining module 10, the component having an electric field vector which vibrates in a parallel direction to the plane of incidence on a polarization plane selective reflection surface 10R of the polarization splitting/combining element constituting the first polarization splitting/combining module 10 is the p component, and the component of the incident light having an electric field vector which vibrates in a perpendicular direction to the plane of incidence is the s component. The second polarization splitting/combining module 18 is constituted similarly, as are third and fourth polarization splitting/combining modules used in second and third embodiments to be described below.

A favorable, commercially available polarization light splitter, for example, may be selected for use as a polarization splitting/combining module such as the first polarization splitting/combining module 10.

As well as having a polarization maintaining property, the third polarization-maintaining single-mode fiber 22 preferably exhibits a large nonlinear optical effect. To enlarge the nonlinear optical effect, the nonlinear optical constant $\gamma(W^{-1} km^{-1})$ based on the optical Kerr effect may be increased by subjecting the core of the optical fiber (corresponding to the core 142 shown in FIG. 2) to high-density $GeO_2$ doping, or the optical energy density inside the optical fiber may be increased by reducing the mode field diameter (MFD), which is the guided mode sectional area of the optical fiber.

For example, although a normal optical fiber with an MFD of 8 μm has a value of approximately $\gamma=2$ $km^{-1}W^{-1}$, an optical fiber with an MFD of 3.6 μm and a value of $\gamma=20$ $km^{-1}W^{-1}$, i.e. a value that is larger by one digit, is also commercially available. Furthermore, fiber formed with cavities in the cladding, known as holey fiber, and optical fiber with high optical nonlinearity, known as photonic band gap fiber, are also under development. It can-therefore be predicted that in the future, such techniques will be incorporated into polarization-maintaining single-mode fiber to develop an optical fiber having high optical nonlinearity and a polarization maintaining property.

In the following description, the direction (polarization plane direction) of the vibration plane of the electric field vector of an input signal light which propagates through the input optical fiber 32-2 to be input into the first polarization splitting/combining module 10 is assumed to be inclined 45 degrees from a parallel plane to the paper surface. It is also assumed that the plane of incidence of the light that is incident on the polarization plane selective reflection surface 10R of the polarization splitting/combining element constituting the first polarization splitting/combining module 10 is set to be parallel to the vibration plane direction of the electric field vector of the incident signal light.

More specifically, in FIG. 1 the vibration plane direction of the electric field vector of the input signal light that propagates through the input optical fiber 32-2 to the first polarization splitting/combining module 10 is inclined 45 degrees from the parallel plane to the paper surface, and the plane of incidence of the light that is incident on the polarization plane selective reflection surface 10R of the first polarization splitting/combining module 10 is set to be parallel to the vibration plane direction of the electric field vector of the input signal light.

The first polarization-maintaining single-mode fiber 12 is connected at the one end thereof to the second input/output terminal 10-2 of the first polarization splitting/combining module 10 in such a manner that the orientation of the optical axis (the slow axis here) of the first polarization-maintaining single-mode fiber 12 is parallel to the direction of the vibration plane of the electric field vector of the input signal light that propagates through the input optical fiber 32-2. Hence, the polarization direction of the signal light that is output from the second input/output terminal 10-2 of the first polarization splitting/combining module 10 and propagated through the first polarization-maintaining single-mode fiber 12 is parallel to the slow axis of the first polarization-maintaining single-mode fiber 12. In the following description, the optical axis of the polarization-maintaining single-mode fiber denotes the slow axis, unless stated otherwise.

For ease of description, it is assumed hereinafter that the slow axis orientation of the first polarization-maintaining single-mode fiber 12 is inclined 45 degrees from the parallel plane to the paper surface, and the slow axis orientation of the second polarization-maintaining single-mode fiber 16 is set parallel to the paper surface. As will be described below, it is possible to set the slow axis of the first polarization-maintaining single-mode fiber 12 and the slow axis of the second polarization-maintaining single-mode fiber 16 at a 45 degree incline from each other in this manner due to the fact that the other end of the first polarization-maintaining single-mode fiber 12 and the one end of the second polarization-maintaining single-mode fiber 16 are connected via the first polarization plane conversion portion 14.

Needless to say, the polarization plane direction of the input signal light may differ from that described above, and the optical switch maybe constituted with the polarization plane set in relation to the fast axis, but since this case is basically identical to that described above, description thereof has been omitted.

In the first polarization splitting/combining module 10, the p-polarized component input through the first input/output terminal 10-1 is output to the third input/output terminal 10-3, and the s-polarized component input through the second input/output terminal 10-2 is output to the third input/output terminal 10-3. The p-polarized component input through the second input/output terminal 10-2 is output to the first input/output terminal 10-1.

Further, the length of the path extending from the second input/output terminal 10-2 of the first polarization splitting/combining module 10 to the first polarization plane conversion portion 14, or in other words the length of the first polarization-maintaining single-mode fiber 12, is set as $l_1$ (also referred to as path $L_1$), the length of the path extending from the first polarization plane conversion portion 14 to the first input/output terminal 18-1 of the second polarization splitting/combining module 18, or in other words the length of the second polarization-maintaining single-mode fiber 16, is set as 12 (also referred to as path $L_2$), the length of the path extending from the second input/output terminal 18-2 of the second polarization splitting/combining module 18 to the second polarization plane conversion portion 24, or in other words the length of the third polarization-maintaining single-mode fiber 22, is set as $l_3$ (also referred to as path $L_3$), and the length of the path extending from the second polarization plane conversion portion 24 to the third input/output terminal 18-3 of the second polarization splitting/combining module 18, or in other words the length of the fourth polarization-maintaining single-mode fiber 26, is set as $l_4$ (also referred to as path $L_4$).

The first polarization plane conversion portion 14 and second polarization plane conversion portion 24 may be constituted using Faraday rotators, or may be realized with the constitution to be described with reference to FIG. 3. FIG. 3 illustrates the structure of a polarization plane conversion portion, in which an optical fiber 170 and an optical fiber 172 are PANDA optical fibers. In FIG. 3, cross-sections 174 and 176 show the schematic constitution of a cross-section of the PANDA optical fibers 170 and 172 severed perpendicular to the light propagation direction. The structure of these cross-sections is identical to that of the PANDA optical fiber described above with reference to FIG. 2.

As shown in the upper portion of FIG. 3, the respective cross-sections of the PANDA optical fibers 170 and 172 are disposed such that their respective slow axes are orthogonal to each other. The first polarization plane conversion portion 14 and second polarization plane conversion portion 24 are formed by cutting one end of the PANDA optical fibers perpendicular to the light propagation direction, and then fusing the PANDA optical fibers such that their respective slow axes (fast axes) are orthogonal to each other and their respective cores match.

(Operation)

An operating principle of the optical switch according to the first embodiment will now be described with reference to FIG. 1. According to the optical switch of the present invention, a linearly polarized signal light, serving as an input signal light that is input into the optical switch, is input into the first input/output terminal 10-1 of the first polarization splitting/combining module 10, and output from the second input/output terminal 10-2 of the first polarization splitting/combining module 10 with its polarization plane maintained.

At this time, the vibration plane direction of the electric field vector of the input signal light which propagates through the input optical fiber 32-2 connected to the first input/output terminal 10-1 of the first polarization splitting/combining module 10 is inclined 45 degrees from the parallel plane to the paper surface. It should also be noted that the plane of incidence of the light that is incident on the polarization plane selective reflection surface 10R of the first polarization splitting/combining module 10 is set to be parallel to the vibration plane direction of the electric field vector of the input signal light. In other words, the polarization plane direction of the signal light output from the second input/output terminal 10-2 of the first polarization splitting/combining module 10 is set to match the optical axis direction of the first polarization-maintaining single-mode fiber 12.

In order to operate the optical switch in this manner, the linearly polarized signal light serving as an input signal light input into the optical switch is input into the first input/output terminal 10-1 of the first polarization splitting/combining module 10 as a p-polarized light. Typically, the polarization plane selective reflection surface of a polarization splitting/combining element transmits only the p component and reflects only the s component. Accordingly, the signal light input into the first input/output terminal 10-1 of the first polarization splitting/combining module 10 as a p-polarized light is output as a p-polarized light from the second input/output terminal 10-2 of the first polarization splitting/combining module 10, which is disposed on the opposite side of the first input/output terminal 10-1.

Following output from the second input/output terminal 10-2 of the first polarization splitting/combining module 10, the signal light is input into the one end of the first polarization-maintaining single-mode fiber 12 and propagated therethrough with its polarization plane matching the optical axis of the first polarization-maintaining single-mode fiber 12. Upon reaching the first polarization plane conversion portion 14 disposed at the other end of the first polarization-maintaining single-mode fiber 12, the signal light passes through the first polarization plane conversion portion 14, and is input into the one end of the second polarization-maintaining single-mode fiber 16.

As described above, the first polarization plane conversion portion 14 is formed by fusing the first polarization-maintaining single-mode fiber 12 and second polarization-maintaining single-mode fiber 16 such that the respective optical axes thereof form an angle of 45 degrees. Therefore, the signal light, having passed through the first polarization plane conversion portion 14, propagates through the second polarization-maintaining single-mode fiber 16 in a polarization state having an electric field vector component (TM component) that is parallel to the optical axis of the second polarization-maintaining single-mode fiber 16, and an electric field vector component (TE component) that is perpendicular thereto. Thus the signal light is input into the first input/output terminal 18-1 of the second polarization splitting/combining module 18.

Following input into the second polarization splitting/combining module 18 through the first input/output terminal 18-1 of the second polarization splitting/combining module 18, the signal light is separated into a first signal light and a second signal light having orthogonal polarization planes, whereupon the separated signal lights are output from the second input/output terminal 18-2 and third input/output terminal 18-3 of the second polarization splitting/combining module 18, respectively.

Figure 4A:
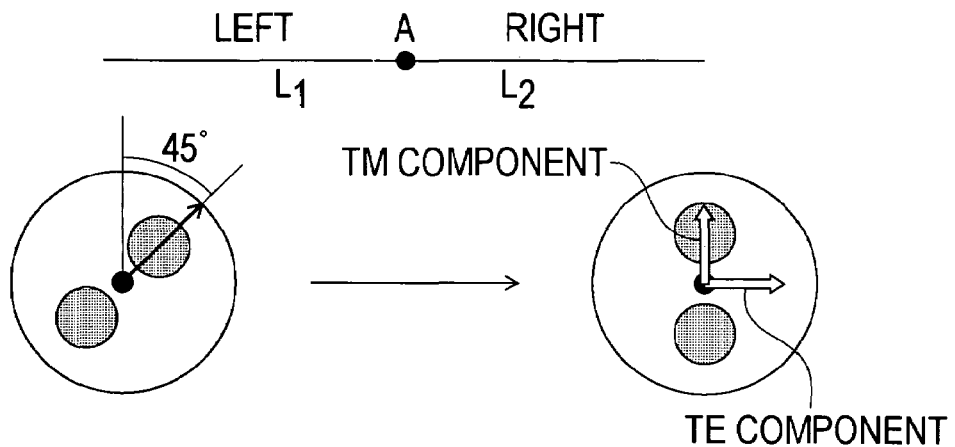
FIGS. 4A–4C are views illustrating an operation of the optical switch according to the first embodiment of the present invention.
Figure 4B:
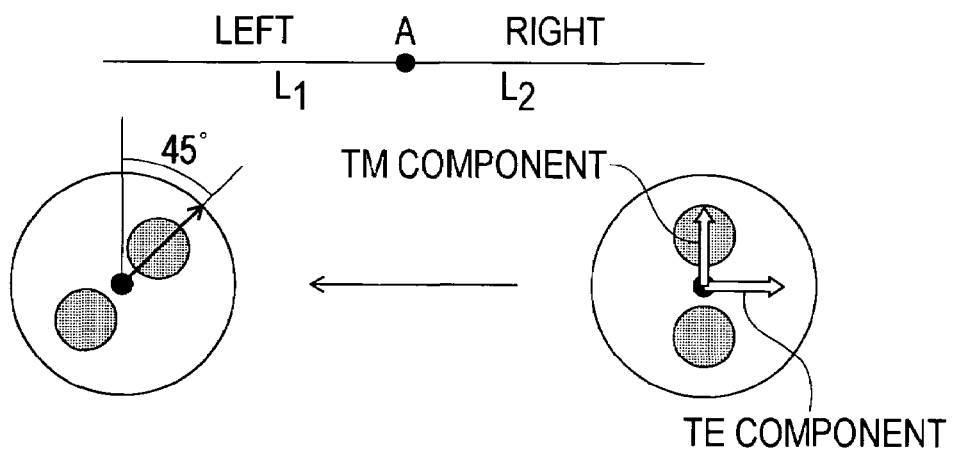
Figure 4C:
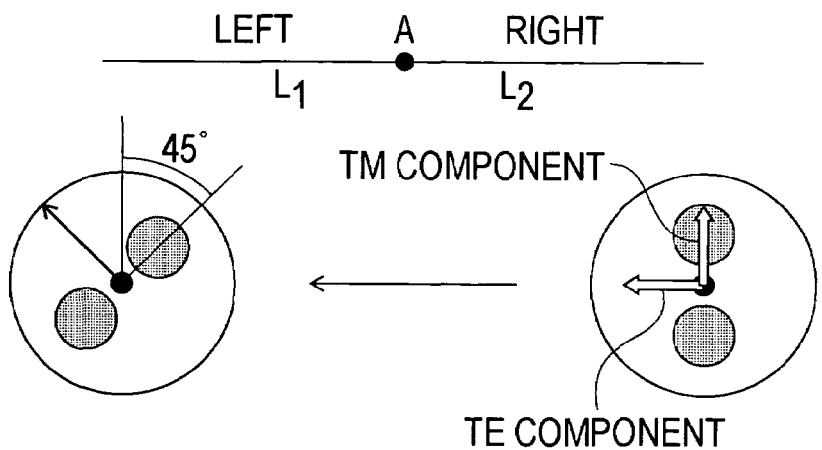

The functions of the first polarization plane conversion portion 14, which connects the other end of the first polarization-maintaining single-mode fiber 12 and the one end of the second polarization-maintaining single-mode fiber 16, will now be described with reference to FIGS. 4A through 4C. In FIGS. 4A through 4C, the left side of the paper surface from a point A, at which the first polarization plane conversion portion 14 is disposed, corresponds to the path $L_1$ constituted by the first polarization-maintaining single-mode fiber 12, and the right side of the paper surface from the point A corresponds to the path $L_2$ constituted by the second polarization-maintaining single-mode fiber 16.

The circular figures drawn on the left side and right side of FIGS. 4A to 4C are schematic cross-sections severed on a perpendicular plane to the first polarization plane conversion portion 14 and the optical axis of the second polarization-maintaining single-mode fiber 16. In the respective cross-sections, the black circle in the center denotes the core, and the two shaded circle portions arranged in series denote the stress-applying portion. Further, the arrows drawn with thick black lines and the arrows outlined in black are vector displays indicating the polarization component vibration direction and intensity of the signal light as the signal light propagates through the first polarization-maintaining single-mode fiber 12 and second polarization-maintaining single-mode fiber 16 respectively.

As described above, the optical axis of the first polarization-maintaining single-mode fiber 12 is set at an angle of 45 degrees from the paper surface, and the plane of incidence of the signal light on the polarization plane selective reflection surface 10R of the first polarization splitting/combining module 10 is set to be parallel thereto. Hence, as shown in the drawings, the vector display indicating the polarization plane of the signal light propagating through the first polarization-maintaining single-mode fiber 12. (path $L_1$) toward the first polarization plane conversion portion 14 is set in a parallel direction to the optical axis. As described above, at the first polarization plane conversion portion 14, disposed in the position indicated by the point A, the first polarization-maintaining single-mode fiber 12 is fused to the second polarization-maintaining single-mode fiber 16 such that the respective optical axes thereof form an angle of 45 degrees, and therefore, having passed through the first polarization plane conversion portion 14, the signal light propagates through the second polarization-maintaining single-mode fiber 16 with the polarization plane thereof having polarization components in both the slow axis and fast axis directions, as shown on the right side of FIG. 4A.

In FIG. 1, the slow axis of the second polarization-maintaining single-mode fiber 16 is illustrated as being set in a parallel direction to the paper surface, and the fast axis of the second polarization-maintaining single-mode fiber 16 is illustrated as being set in a perpendicular direction to the paper surface. Accordingly, the electric field vector component of the signal light propagating through the second polarization-maintaining single-mode fiber 16 that is parallel to the slow axis is TM polarization, and the electric field vector component of the signal light that is parallel to the fast axis is TE polarization.

The first signal light is output from the second input/output terminal 18-2 of the second polarization splitting/combining module 18, and propagates clockwise (also referred to as the CW direction) through the optical fiber loop constituted by the third polarization-maintaining single-mode fiber 22 (path $L_3$) and fourth polarization-maintaining single-mode fiber 26 (path $L_4$). More specifically, the first signal light is input from the one end of the third polarization-maintaining single-mode fiber 22, propagates through the third polarization-maintaining single-mode fiber 22, passes through the second polarization plane conversion portion 24 provided on the other end of the third polarization-maintaining single-mode fiber 22, and is input into the fourth polarization-maintaining single-mode fiber 26.

The second polarization plane conversion portion 24 is formed by fusing the third polarization-maintaining single-mode fiber 22 and fourth polarization-maintaining single-mode fiber 26 such that the respective optical axes thereof form an angle of 90 degrees, for example. Accordingly, the polarization plane of the first signal light is rotated 90 degrees after propagating through the third polarization-maintaining single-mode fiber 22, whereupon the first signal light is input into the fourth polarization-maintaining single-mode fiber 26. Having propagated through the fourth polarization-maintaining single-mode fiber 26, the first signal light is input into the third input/output terminal 18-3 of the second polarization splitting/combining module 18.

Meanwhile, the second signal light is output from the third input/output terminal 18-3 of the second polarization splitting/combining module 18, and propagates counterclockwise (also referred to as the CCW direction) through the optical fiber loop constituted by the fourth polarization-maintaining single-mode fiber 26 (path $L_4$) and third polarization-maintaining single-mode fiber 22 (path $L_3$). More specifically, the second signal light is input from the one end of the fourth polarization-maintaining single-mode fiber 26, propagates through the fourth polarization-maintaining single-mode fiber 26, passes through the second polarization plane conversion portion 24 provided on the other end of the fourth polarization-maintaining single-mode fiber 26, and is input into the third polarization-maintaining single-mode fiber 22. In the second polarization plane conversion portion 24, similarly to the first signal light, the polarization plane of the second signal light is rotated 90 degrees after propagating through the fourth polarization-maintaining single-mode fiber 26, whereupon the second signal light is input into the third polarization-maintaining single-mode fiber 22. Having propagated through the third polarization-maintaining single-mode fiber 22, the second signal light is input into the second input/output terminal 18-2 of the second polarization splitting/combining module 18.

Here, the polarization plane direction of the second signal light input into the second input/output terminal 18-2 of the second polarization splitting/combining module 18 matches the polarization plane direction of the first signal light output to the second input/output terminal 18-2 of the second polarization splitting/combining module 18, from the signal light that is input into the second polarization splitting/combining module through the first input/output terminal 18-1 of the second polarization splitting/combining module 18. Further, the polarization plane direction of the first signal light input into the third input/output terminal 18-3 of the second polarization splitting/combining module 18 matches the polarization plane direction of the second signal light output to the third input/output terminal 18-3 of the second polarization splitting/combining module 18, from the signal light that is input into the second polarization splitting/combining module 18 through the first input/output terminal 18-1 of the second polarization splitting/combining module 18.

After the second signal light and first signal light are combined in the second polarization splitting/combining module 18, the signal light propagates from the second polarization-maintaining single-mode fiber 16 toward the first polarization-maintaining single-mode fiber 12, i.e. in the opposite direction to that in which the signal light was input, in exactly the same polarization state as that in which the signal light was input toward the second polarization splitting/combining module 18. The signal light is then input through the second input/output terminal 10-2 of the first polarization splitting/combining module 10 and output from the first input/output terminal 10-1 on the opposite side of the second input/output terminal 10-2.

Hence, as described above, the linearly polarized (having a polarization plane direction which forms an angle of 45 degrees with the paper surface) signal light input into the first input/output terminal 10-1 of the first polarization splitting/combining module 10 is output in the same polarization state as that in which it is input through the first input/output terminal 10-1 of the first polarization splitting/combining module 10. In other words, it may be considered that the signal light input into the optical switch is reflected and then output from the first input/output terminal 10-1 of the first polarization splitting/combining module 10, and therefore a signal light that is output from the first input/output terminal 10-1 of the first polarization splitting/combining module 10 will be referred to hereafter as loop reflection light.

Next, a case in which a control light is input through the optical coupler 20 provided on the third polarization-maintaining single-mode fiber 22 will be considered. In this case, the phase velocity of the first signal light propagating through the third polarization-maintaining single-mode fiber 22 is altered. By adjusting the length ($=l_3$) of the third polarization-maintaining single-mode fiber 22 (path $L_3$) according to the intensity of the control light and comparing cases in which the control light is present and absent when the first signal light propagates through the third polarization-maintaining single-mode fiber 22, the resulting phase difference $\phi$, obtained in the above equation (1), can be set exactly to $\pi$.

The nonlinear optical constant $\gamma(W^{-1}km^{-1})$ and the power $P(W)$ of the control light are determined by the basic constitution of the optical communication system in which the optical switch is used, and therefore, by adjusting the length of the optical fiber constituting the optical fiber loop, or in other words by adjusting $L(km)$, which is the length ($=l_3$) of the third polarization-maintaining single-mode fiber 22 (path $L_3$), the phase difference $\phi$, obtained in the above equation (1), can be set exactly to $\pi$, as is shown clearly in the equation (1).

Once the second signal light and first signal light have been combined in the second polarization splitting/combining module 18, the signal light propagates from the second polarization-maintaining single-mode fiber 16 toward the first polarization-maintaining single-mode fiber 12. After passing through the first polarization plane conversion portion 14, the signal light propagates through the first polarization-maintaining single-mode fiber 12 as an output signal light having an orthogonal polarization plane to the polarization plane direction of the input signal light. Here, the input signal light denotes a signal light which passes through the first polarization plane conversion portion 14 from the first polarization-maintaining single-mode fiber 12, and then propagates toward the second polarization-maintaining single-mode fiber 16. The output signal light denotes a signal light which passes through the first polarization plane conversion portion 14 from the second polarization-maintaining single-mode fiber 16, and then propagates through the first polarization-maintaining single-mode fiber 12.

Hence, the output signal light is input through the second input/output terminal 10-2 of the first polarization splitting/combining module 10, and output from the third input/output terminal 10-3. Hereafter, a signal light which is output from the third input/output terminal 10-3 of the first polarization splitting/combining module 10 in this manner will also be referred to as loop transmission light.

Here, the effective index of the slow axis of the PANDA optical fiber serving as the first through fourth polarization-maintaining single-mode fibers is set as $n_s$, and the effective index of the fast axis is set as $n_f$. It is also assumed that the slow axis direction matches the polarization plane of the TM polarization, and the fast axis direction matches the polarization plane of the TE polarization.

First, the propagation path of the signal light component that starts from the first polarization plane conversion portion 14 disposed at the point A, propagates through the second polarization-maintaining single-mode fiber 16 as a TM polarization component, and is then input into the first input/output terminal 18-1 of the second polarization splitting/combining module 18 will be considered. As the first signal light, this signal light component propagates through the second polarization-maintaining single-mode fiber 16 as a TM polarization component, is input into the first input/output terminal 18-1 of the second polarization splitting/combining module 18 as a p-polarized light, output from the second input/output terminal 18-2, and then propagates through the third polarization-maintaining single-mode fiber 22 as a TM polarization component. As a result of passing through the second polarization plane conversion portion 24, the signal light component then propagates through the fourth polarization-maintaining single-mode fiber 26 as a TE component, is input into the third input/output terminal 18-3 of the second polarization splitting/combining module 18 as an s-polarized light, output from the first input/output terminal 18-1, propagates through the second polarization-maintaining single-mode fiber 16 as a TE polarization component, and then returns to the first polarization plane conversion portion 14 disposed at the point A.

The optical path length of the propagation path taken by a signal light component which propagates through the second polarization-maintaining single-mode fiber 16 as a TM polarization component and is input into the first input/output terminal 18-1 of the second polarization splitting/combining module 18 is obtained by adding together the paths along which the signal light component propagates, or in other words according to the following equation (2).

$$n_s l_2 + n_s l_3 + n_f l_4 + n_f l_2 \quad (2)$$

Here, $l_2$, $l_3$, and $l_4$ are the respective lengths of the paths $L_2$, $L_3$, and $L_4$.

More specifically, the signal light component propagates along the path $L_2$ formed by the second polarization-maintaining single-mode fiber 16 as TM polarization, and therefore the optical path length is $n_s l_2$, and the signal light component propagates along the path $L_3$ formed by the third polarization-maintaining single-mode fiber 22 as TM polarization, and therefore the optical path length is $n_s l_3$. As a result of passing through the second polarization plane conversion portion 24, the signal light component propagates along the path $L_4$ formed by the fourth polarization-maintaining single-mode fiber 26 as a TE component, and therefore the optical path length is $n_f l_4$, and the signal light component propagates along the path $L_2$ formed by the second polarization-maintaining single-mode fiber 16 as a TE polarization component, and therefore the optical path length is $n_f l_2$. Thus the total optical path length is obtained according to the above equation (2).

Meanwhile, the optical path length of the propagation path taken by a signal light component which propagates through the second polarization-maintaining single-mode fiber 16 as a TE polarization component and is input into the first input/output terminal 18-1 of the second polarization splitting/combining module 18 is obtained by adding together the paths along which the signal light component propagates, or in other words according to the following equation (3).

$$n_f l_2 + n_f l_4 + n_s l_3 + n_s l_2 \quad (3)$$

Here, $l_2$, $l_3$, and $l_4$ are the respective lengths of the paths $L_2$, $L_3$, and $L_4$.

More specifically, the signal light component propagates along the path $L_2$ formed by the second polarization-maintaining single-mode fiber 16 as TE polarization, and therefore the optical path length is $n_f l_2$, and the signal light component propagates along the path $L_4$ formed by the fourth polarization-maintaining single-mode fiber 26 as TE polarization, and therefore the optical path length is $n_f l_4$. As a result of passing through the second polarization plane conversion portion 24, the signal light component propagates along the path $L_3$ formed by the third polarization-maintaining single-mode fiber 22 as TM polarization, and therefore the optical path length is $n_s l_3$, and the signal light component propagates along the path $L_2$ formed by the second polarization-maintaining single-mode fiber 16 as TM polarization, and therefore the optical path length is $n_s l_2$. Thus the total optical path length is obtained according to the above equation (3).

Note that the control light travels in the CW direction along the same path as the first signal light.

It can be seen from a comparison of the equations (2) and (3) that the first, second, third, and fourth items in the equation (2) are equal to the fourth, third, second, and first items in the equation (3), respectively. In other words, the first signal light and second signal light propagate over the same optical path length.

As described above, in the optical switch of the present invention, the first signal light and second signal light share the same path, and therefore variation in the wavelength of the signal light or the ambient temperature of the optical switch does not affect the operating characteristics, enabling the realization of an optical switch which is assured of a stable operation.

When the control light is not input, both the TM polarization component and the TE polarization component of the signal light, which start from the first polarization plane conversion portion 14 disposed at the point A, propagate through the second polarization-maintaining single-mode fiber 16, and are input into the first input/output terminal 18-1 of the second polarization splitting/combining module 18, are combined in phase in the second polarization splitting/combining module 18. As a result, the signal light input into the optical switch through the input optical fiber 32-2 is output as loop reflection light from the same input optical fiber 32-2 into which it was input.

On the other hand, when the control light is input from the optical coupler 20, the optical Kerr effect is generated in the third polarization-maintaining single-mode fiber 22, thereby altering the refractive index. As a result, when the first signal light propagating in the CW direction and the second signal light propagating in the CCW direction propagate respectively through the optical fiber loop constituted by the path $L_3$ and the path $L_4$ and are re-combined in the second polarization splitting/combining module 18, the phases of the two lights are offset. As described above, the length of the third polarization-maintaining single-mode fiber 22 may be adjusted such that the phase shift amount $\phi$ is equal to $\pi$.

An operation of the optical switch of the present invention will now be described in detail with reference to FIG. 1, using as an example a case in which a time division multiplex pulse signal is switched. In FIG. 1, the schematic temporal waveforms of the signal light serving as an optical pulse signal, the control light, and the transmission light and reflection light produced as a result of switching of the optical pulse signal are illustrated using the abscissa as the temporal axis. A binary digital signal in which "0" and "1" correspond to the presence and absence of an optical pulse is envisaged. A case in which a signal light constituted by regularly arranged optical pulses with a wavelength of $\lambda s$ is controlled (switched) by a control light constituted by an array of optical pulses with a wavelength of $\lambda p$ expressing "1011" will be considered.

The signal light is input into the input optical fiber 32-1, passes through an optical circulator 30, propagates through the input optical fiber 32-2, and is thus input into the first input/output terminal 10-1 of the first polarization splitting/combining module 10. As described above, the signal light passes through the first polarization splitting/combining module 10 and propagates through the first polarization-maintaining single-mode fiber 12, whereby a part of its components reaches the optical coupler 20 provided on the third polarization-maintaining single-mode fiber 22.

It is assumed that a first optical pulse (the optical pulse positioned furthest to the right of the temporal axis in FIG. 1), which is a first optical pulse of the control light, is input from the optical coupler 20 at exactly the same time as a first optical pulse (the optical pulse positioned furthest to the right of the temporal axis in FIG. 1), which is a first optical pulse of the signal light, passes through the optical coupler 20. Of course it is also assumed that the control light is input into the third polarization-maintaining single-mode fiber via the optical coupler 20 as TM polarization.

The optical pulse (wavelength $\lambda s$) of the first signal light and the optical pulse (wavelength $\lambda p$) of the control light propagate in parallel through the third polarization-maintaining single-mode fiber 22 and fourth polarization-maintaining single-mode fiber 26. As a result, the effective index of the third polarization-maintaining single-mode fiber 22 and fourth polarization-maintaining single-mode fiber 26 in relation to the first signal light optical pulse is altered by the optical Kerr effect produced by the control light optical pulse. In other words, due to the presence of the control light optical pulse as the first signal light optical pulse and control light optical pulse propagate in parallel through the third polarization-maintaining single-mode fiber 22 and fourth polarization-maintaining single-mode fiber 26, the first signal light optical pulse propagates along the optical path with a constantly-changing effective index. Meanwhile, the second signal light optical pulse (wavelength λs) propagates through the third polarization-maintaining single-mode fiber 22 in the opposite direction to the first signal light optical pulse, without being affected by the control light optical pulse.

As a result, the values of the effective indices $n_s$ and $n_f$ in the above equation (2) differ from the values of the effective indices $n_s$ and $n_f$ in the above equation (3). In other words, the values of the effective indices in the above equation (2) become $n_s'$ and $n_f'$.

By adjusting the lengths of the path $L_3$ (third polarization-maintaining single-mode fiber) and the path $L_4$ (fourth polarization-maintaining single-mode fiber) to $(n_s l_2 + n_s' l_3 + n_f' l_4 + n_f l_2) - (n_f l_2 + n_f l_4 + n_s l_3 + n_s l_2) = \lambda s/2$, the phase difference between the first signal light optical pulse and second signal light optical pulse when combined in the second polarization splitting/combining module 18 can be set to π.

To be precise, the wavelengths of the control light and signal light are λp and λs respectively, and are therefore different. Hence, a group delay time difference between the control light and signal light caused by group velocity dispersion generated in the third polarization-maintaining single-mode fiber 22 and fourth polarization-maintaining single-mode fiber 26 must be shorter than the occurrence interval of the signal light optical pulse on the temporal axis, or in other words the time interval occupied by one bit (one optical pulse) of the signal light. However, the difference between the wavelength λp of the control light and the wavelength λs of the signal light is negligible, and therefore this condition can be satisfied easily. As will be described below, the difference between the wavelength λp of the control light and the wavelength λs of the signal light should be sufficient to block the control light and transmit the signal light using an optical band-pass filter 28 disposed on the output side of the optical switch so that only switched signal lights are output from the optical switch.

When a second optical pulse of the first signal light passes through the optical coupler 20 following the first optical pulse, a second optical pulse serving as the next optical pulse of the control light is present, but when a third optical pulse of the first signal light passes through the optical coupler 20 following the second optical pulse, no third optical pulse exists as the next optical pulse of the control light after the second optical pulse. In this case, the first signal light optical pulse propagates along the optical path constituted by the paths $L_3$ and $L_4$ without a control light optical pulse, or in other words not in parallel with a control light optical pulse.

Hence, the first signal light optical pulse and second signal light optical pulse are combined in phase in the second polarization splitting/combining module 18. Accordingly, as will be described below, the signal light optical pulse is output to the first port 10-1 of the first polarization splitting/combining module 10 as loop reflection light, propagates through the input optical fiber 32-2, and is output via the optical circulator 30 toward a reflection light output optical fiber 36 on a different transmission line to that along which the signal light originally propagated.

As a result, the optical pulse array constituting the transmission light that is output to a transmission light output optical fiber 29 from the band-pass filter 28 reflects the optical pulse array constituting the control light, as shown in FIG. 1. The reflection light propagates as loop reflection light through the reflection light output optical fiber 36 via the optical circulator 30 and is output to the outside only when a signal light optical pulse is present during the time period in which no control light optical pulse is present, and therefore takes the pulse array shown in FIG. 1.

Further, the control light having the wavelength λp is also output from the third input/output terminal 10-3 of the first polarization splitting/combining module 10, and therefore, in order to extract only the switched signal light having the wavelength λs, it is necessary to connect one end of an output optical fiber 27 to the third input/output terminal 10-3 of the first polarization splitting/combining module 10, and connect the optical band-pass filter 28, which is capable of blocking the wavelength λp and has a central transmission wavelength of λs, to the other end of the output optical fiber 27.

If the optical circulator 30 is not provided, the first signal light optical pulse output as loop reflection light to the first input/output terminal 10-1 of the first polarization splitting/combining module 10 advances back along its original transmission line, and as a result, is returned to the transmission side. In typical time division multiplex optical communication, it is undesirable for a part of a transmission signal to be transmitted back from the reception side to the transmission side, and therefore, using the optical circulator 30, the signal light optical pulse that is output as loop reflection light to the first input/output terminal 10-1 of the first polarization splitting/combining module 10 can be output toward a different transmission line to the transmission line along which the signal light was originally propagated.

Here, as described above, after the second signal light and first signal light are combined in the second polarization splitting/combining module 18, the signal light propagates from the second polarization-maintaining single-mode fiber 16 in the direction of the first polarization-maintaining single-mode fiber 12, and when the signal light passes through the first polarization plane conversion portion 14, the signal light propagates through the first polarization-maintaining single-mode fiber 12 as an output signal light having an orthogonal polarization plane to the polarization plane direction of the input signal light. The reason for this will now be described with reference to FIGS. 4A to 4C.

First, a case in which the control light optical pulse is not input into the third polarization-maintaining single-mode fiber 22 through the optical coupler 20 in synchronization with the timing at which the signal light optical pulse passes through the optical coupler 20 will be investigated. In this case, the signal light propagating through the third polarization-maintaining single-mode fiber 22 does not undergo mutual phase modulation based on the optical Kerr effect.

Accordingly, the first signal light and second signal light are combined in the second polarization splitting/combining module 18 and output from the first input/output terminal 18-1 of the second polarization splitting/combining module 18, and the TM and TE components of the signal light propagating through the second polarization-maintaining single-mode fiber 16 toward the first polarization plane conversion portion 14 are as shown in FIG. 4B, i.e. identical to the TM and TE components of the signal light in the case shown in FIG. 4A, where the signal light passes through the first polarization plane conversion portion 14, propagates through the second polarization-maintaining single-mode fiber 16, and is input into the first input/output terminal 18-1 of the first polarization splitting/combining module 18.

Next, a case in which the control light optical pulse is input into the third polarization-maintaining single-mode fiber 22 through the optical coupler 20 in synchronization with the timing at which the signal light optical pulse passes through the optical coupler 20 will be investigated. In this case, the signal light propagating through the third polarization-maintaining single-mode fiber 22 undergoes mutual phase modulation based on the optical Kerr effect such that the phase difference between the first signal light optical pulse and second signal light optical pulse when combined in the second polarization splitting/combining module 18 is π.

In this case, the phase of the first signal light optical pulse is later than the phase of the second signal light optical pulse by π, and hence the first signal light optical pulse reaches a polarization plane selective reflection surface 18R of the second polarization splitting/combining module 18 at a delay of π. The polarization plane of the first signal light that propagates through the third polarization-maintaining single-mode fiber 22 (path $L_3$) and fourth polarization-maintaining single-mode fiber 26 (path $L_4$) to be input into the third input/output terminal 18-3 of the second polarization splitting/combining module 18 is an s-polarization component in relation to the polarization plane selective reflection surface 18R, and is therefore reflected by the polarization plane selective reflection surface 18R so as to propagate through the second polarization-maintaining single-mode fiber 16 (path $L_2$) as a TE polarization component, and thus reaches the first polarization plane conversion portion 14. Hence, the TE polarization component of the signal light in the first polarization plane conversion portion 14 on the second polarization-maintaining single-mode fiber 16 (path $L_2$) is as shown in FIG. 4C. The first signal light optical pulse undergoes mutual phase modulation based on the optical Kerr effect produced by the control light optical pulse, and therefore the phase of the first signal light optical pulse is later than the phase of the second signal light optical pulse by π such that the first signal light optical pulse reaches the polarization plane selective reflection surface 18R of the second polarization splitting/combining module 18 at a delay of π. This delay is reflected in the first polarization plane conversion portion 14 of the second polarization-maintaining single-mode fiber 16 such that here, the TE polarization component faces a 180 degrees' opposite direction (π when expressed as the phase) to the TE polarization component shown in FIGS. 4A and 4B.

The signal light in the polarization state shown in FIG. 4C passes through the first polarization plane conversion portion 14 from the second polarization-maintaining single-mode fiber 16 (path $L_2$), and then propagates through the first polarization-maintaining single-mode fiber 12 (path $L_1$). In other words, the polarization direction of the signal light propagating through the first polarization-maintaining single-mode fiber 12 (path $L_1$) is determined by adding the TM component and TE component in the second polarization-maintaining single-mode fiber 16 (path $L_2$) vectorially, and therefore, as shown on the left of FIG. 4C, the signal light has an orthogonal polarization plane to the polarization direction of the input signal light (the polarization direction shown in FIGS. 4A and 4B).

The input signal light is input with the polarization direction thereof serving as a p-polarized component in relation to the polarization selective reflection surface 10R of the first polarization splitting/combining module 10, whereas the output signal light is output from the third input/output terminal 10-3 of the first polarization splitting/combining module 10 with the polarization plane direction thereof serving as an s-polarized component in relation to the polarization selective reflection surface 10R of the first polarization splitting/combining module 10.

Hence in this case, the output signal light is reflected by the polarization selective reflection surface 10R of the first polarization splitting/combining module 10 and output from the third input/output terminal 10-3 of the first polarization splitting/combining module 10 such that only the signal light is selected by the band-pass filter 28 via the output optical fiber 27 and output to the outside through the transmission light output optical fiber 29 as transmission light.

Next, polarization cross talk will be investigated. In this optical switch, polarization cross talk occurs mainly in the third polarization-maintaining single-mode fiber 22, which has the longest fiber length. The polarization cross talk component mixed into the first signal light has an orthogonal polarization direction to the polarization direction of the first signal light, and is therefore output from the fourth input/output terminal 18-4 of the second polarization splitting/combining module 18 following input into the third input/output terminal 18-3 thereof. In other words, the polarization cross talk component mixed into the first signal light is a p-polarized component in relation to the polarization plane selective reflection surface 18R of the second polarization splitting/combining module 18. In contrast, the polarization direction of the first signal light is an s-polarized component in relation to the polarization plane selective reflection surface 18R.

More specifically, the first signal light not including a polarization cross talk component is input through the third input/output terminal 18-3, and then output to the first input/output terminal 18-1. Hence the polarization cross talk component mixed into the first signal light is unable to reach the first polarization plane conversion portion 14 disposed at the point A, and therefore does not interfere with the signal light. Hence, when loop transmission light is output from the third input/output terminal 10-3 of the first polarization splitting/combining module 10, a part of the components of the signal light is not output from the first input/output terminal 10-1 as a noise component.

The polarization cross talk component mixed into the second signal light has an orthogonal polarization direction (an s-polarized component in relation to the polarization plane selective reflection surface 18R) to the polarization direction of the second signal light (a p-polarized component in relation to the polarization plane selective reflection surface 18R). Similarly, this component is input through the second input/output terminal 18-2 of the second polarization splitting/combining module 18, and then output from the fourth input/output terminal 18-4 thereof.

More specifically, the second signal light not including a polarization cross talk component is input through the second input/output terminal 18-2, and then output to the first input/output terminal 18-1. Hence the polarization cross talk component mixed into the second signal light is unable to reach the first polarization plane conversion portion 14 disposed at the point A, and therefore does not interfere with the signal light. Hence, when loop transmission light is output from the third input/output terminal 10-3 of the first polarization splitting/combining module 10, a part of the components of the signal light is not output from the first input/output terminal 10-1 as a noise component.

Thus, according to the optical switch of the present invention, the polarization cross talk component does not affect the switching operation even when the third polarization-maintaining single-mode fiber is long. As a result, an optical switch assured of a stable operation, which is not affected by polarization cross talk, is realized.

By adding an optical nonlinear control portion to be described below to the optical switch of the present invention described above, the optical fiber length required to generate the optical Kerr effect can be reduced substantially, on the condition that the type of optical fiber used in the optical fiber loop and the intensity of the control light are determined as design parameters, and as a result, a compact optical switch can be provided. Typically, when an optical switch is employed in time-division multiplex optical communication, the usable optical fiber material and control light intensity are set in advance as design prerequisites, depending on conditions such as the wavelength, intensity, and so on of the optical carrier.

[Second Embodiment]

The structure and operation of an optical switch according to a second embodiment will now be described with reference to FIG. 5.

(Structure)

This optical switch comprises the first polarization splitting/combining module 10, the second polarization splitting/combining module 18, the first polarization-maintaining single-mode fiber 12, the second polarization-maintaining single-mode fiber 16, the first polarization plane conversion portion 14, the third polarization-maintaining single-mode fiber 22, a sixth polarization-maintaining single-mode fiber 60, a seventh polarization-maintaining single-mode fiber 64, a second polarization plane conversion portion 62, and an optical nonlinear control portion 50. The optical band-pass filter 28 and optical circulator 30 are also preferably provided.

The first polarization splitting/combining module 10 comprises the first input/output terminal 10-1 for inputting a signal light, the second input/output terminal 10-2 provided on the opposite side of the first input/output terminal 10-1, to which the one end of the first polarization-maintaining single-mode fiber 12 is connected, and the third input/output terminal 10-3 for outputting a switched signal light.

The second polarization splitting/combining module 18 comprises the first input/output terminal 18-1 to which the other end of the second polarization-maintaining single-mode fiber 16 is connected, the second input/output terminal 18-2 provided on the opposite side of the first input/output terminal 18-1, to which the one end of the third polarization-maintaining single-mode fiber 22 is connected, the third input/output terminal 18-3 to which one end of the seventh polarization-maintaining single-mode fiber 64 is connected, and the fourth input/output terminal 18-4 provided on the opposite side of the third input/output terminal 18-3 for outputting the polarization cross talk component.

The one end of the first polarization-maintaining single-mode fiber 12 is connected to the second input/output terminal 10-2 of the first polarization splitting/combining module 10, and the other end of the second polarization-maintaining single-mode fiber 16 is connected to the first input/output port 18-1 of the second polarization splitting/combining module 18. The other end of the first polarization-maintaining single-mode fiber 12 and the one end of the second polarization-maintaining single-mode fiber 16 are connected to each other via the first polarization plane conversion portion 14.

The third polarization-maintaining single-mode fiber 22 is connected at the one end thereof to the second input/output terminal 18-2 of the second polarization splitting/combining module 18, and comprises the optical coupler 20. The one end of the seventh polarization-maintaining single-mode fiber 64 is connected to the third input/output terminal 18-3 of the second polarization splitting/combining module 18. The other end of the seventh polarization-maintaining single-mode fiber 64 and one end of the sixth polarization-maintaining single-mode fiber 60 are connected to each other via the second polarization plane conversion portion 62.

The optical nonlinear control portion 50 is constituted by a third polarization splitting/combining module 52, a fourth polarization-maintaining single-mode fiber 54, a fifth polarization-maintaining single-mode fiber 58, and a third polarization plane conversion portion 56. The other end of the third polarization-maintaining single-mode fiber 22 is connected to a first input/output terminal 52-1 of the third polarization splitting/combining module 52. One end of the fourth polarization-maintaining single-mode fiber 54 is connected to a second input/output terminal 52-2 on the opposite side of the first input/output terminal 52-1. The other end of the fifth polarization-maintaining single-mode fiber 58 is connected to a third input/output terminal 52-3. The other end of the sixth polarization-maintaining single-mode fiber 60 is connected to a fourth input/output terminal 52-4 on the opposite side of the third input/output terminal 52-3.

Figure 5:
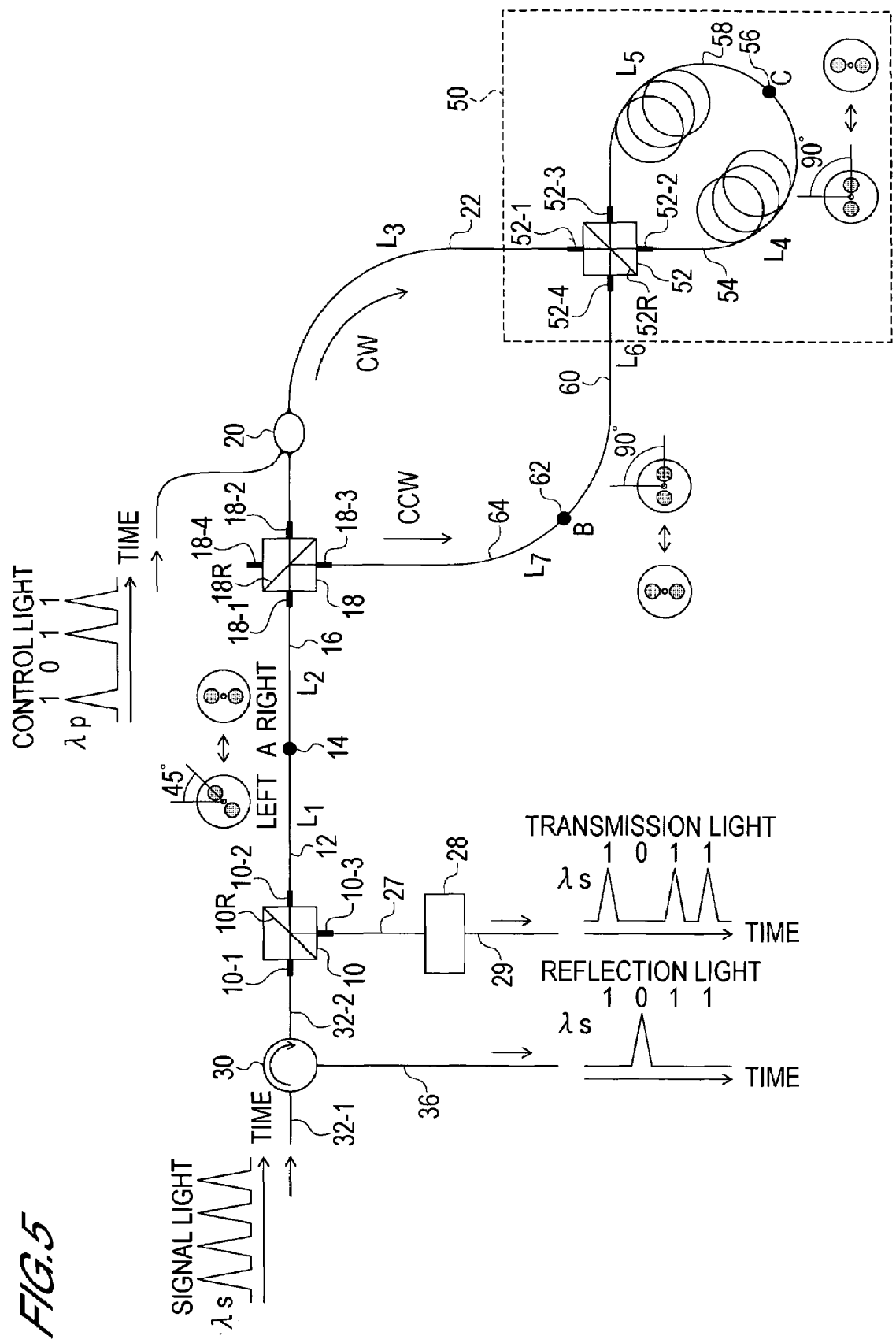
FIG. 5 is a block diagram of an optical switch according to a second embodiment.

The other end of the fourth polarization-maintaining single-mode fiber 54 and one end of the fifth polarization-maintaining single-mode fiber 58 are connected to each other via the third polarization plane conversion portion 56 disposed in a position indicated by a point C in FIG. 5. The third polarization plane conversion portion 56 is formed, for example, by fusing the fourth polarization-maintaining single-mode fiber 54 and fifth polarization-maintaining single-mode fiber 58 such that the respective optical axes thereof are rotated 90 degrees from each other.

The optical switch of the second embodiment shown in FIG. 5 has the same structure as the optical switch of the first embodiment shown in FIG. 1 other than the provision of the optical nonlinear control portion 50, and the functions of these identical structural parts are common to the first and second embodiments. Accordingly, description of operations based on the structure and functions of these shared parts has been omitted, and only effects generated on the basis of the structure and functions of the optical nonlinear control portion 50 will be described.

The length of the path extending from the second input/output terminal 52-2 of the third polarization splitting/combining module 52 to the third polarization plane conversion portion 56, or in other words the length of the fourth polarization-maintaining single-mode fiber 54, is set as $l_4$ (also referred to as a path $L_4$), and the length of the path extending from the third input/output terminal 52-3 of the third polarization splitting/combining module 52 to the third polarization plane conversion portion 56, or in other words the length of the fifth polarization-maintaining single-mode fiber 58, is set as $l_5$ (also referred to as a path $L_5$)

(Operation)

According to the optical switch of the second embodiment, the first signal light that propagates through the third polarization-maintaining single-mode fiber 22 in the CW direction is input into the first input/output terminal 52-1 of the third polarization splitting/combining module 52 in the optical nonlinear control portion 50, and the second signal light that propagates through the sixth polarization-maintaining single-mode fiber 60 in the CCW direction is input into the fourth input/output terminal 52-4 of the third polarization splitting/combining module 52 in the optical nonlinear control portion 50.

The first signal light is input through the first input/output terminal 52-1 of the third polarization splitting/combining module 52, output from the second input/output terminal 52-2 positioned on the opposite side to the first input/output terminal 52-1, input into the fourth polarization-maintaining single-mode fiber 54, then propagates through the fourth polarization-maintaining single-mode fiber 54, has its polarization plane rotated 90 degrees by the third polarization plane conversion portion 56, propagates through the fifth polarization-maintaining single-mode fiber 58, and is input into the third input/output terminal 52-3 of the third polarization splitting/combining module 52. The first signal light is then output from the second input/output terminal 52-2 of the third polarization splitting/combining module 52, propagates again through the fourth polarization-maintaining single-mode fiber 54, has its polarization plane rotated 90 degrees again by the third polarization plane conversion portion 56, propagates through the fifth polarization-maintaining single-mode fiber 58, and is input into the third input/output terminal 52-3 of the third polarization splitting/combining module 52. The first signal light is then output from the fourth input/output terminal 52-4 on the opposite side to the third input/output terminal 52-3, and propagates through the sixth polarization-maintaining single-mode fiber 60.

Meanwhile, the second signal light is input into the fourth input/output terminal 52-4 of the third polarization splitting/combining module 52, output from the third input/output terminal 52-3 on the opposite side to the fourth input/output terminal 52-4, input into the fifth polarization-maintaining single-mode fiber 58, then propagates through the fifth polarization-maintaining single-mode fiber 58, has its polarization plane rotated 90 degrees by the third polarization plane conversion portion 56, propagates through the fourth polarization-maintaining single-mode fiber 54, and is input into the second input/output terminal 52-2 of the third polarization splitting/combining module 52. The second signal light is then output from the third input/output terminal 52-3 of the third polarization splitting/combining module 52, propagates again through the fifth polarization-maintaining single-mode fiber 58, has its polarization plane rotated 90 degrees again by the third polarization plane conversion portion 56, propagates through the fourth polarization-maintaining single-mode fiber 54, is input through the second input/output terminal 52-2 of the third polarization splitting/combining module 52, output from the first input/output terminal 52-1 on the opposite side to the second input/output terminal 52-2, input into the third polarization-maintaining single-mode fiber 22, and then propagates through the third polarization-maintaining single-mode fiber 22.

In the optical nonlinear control portion 50, the contribution of the control light to phase variation of the signal light is produced in the fourth polarization-maintaining single-mode fiber 54 and fifth polarization-maintaining single-mode fiber 58. In other words, phase variation of the signal light becomes more striking as the fourth polarization-maintaining single-mode fiber 54 and fifth polarization-maintaining single-mode fiber 58 increase in length.

As described above, the first and second signal lights each propagate through the fourth polarization-maintaining single-mode fiber 54 and fifth polarization-maintaining single-mode fiber 58 twice. This is due to the 90 degrees' rotation of the polarization plane by the third polarization plane conversion portion 56, and the polarization plane selectivity of the polarization plane selective reflection surface of the third polarization splitting/combining module 52. The reason for this is as follows.

First, considering the first signal light, following output from the second input/output terminal 52-2 of the third polarization splitting/combining module 52, the first signal light propagates along the path $L_4$ as TM polarization, and then passes through the third polarization plane conversion portion 56 to be converted into TE polarization. The first signal light then propagates along the path $L_5$ and is input into the third input/output terminal 52-3 of the third polarization splitting/combining module 52.

When input into the third polarization splitting/combining module 52 as TM polarization, the first signal light passes directly through the interior of the third polarization splitting/combining module 52 and is output to the input/output terminal on the opposite side of the input side. On the other hand, when input into the third polarization splitting/combining module 52 as TE polarization, the first signal light is reflected by a reflective surface 52R having polarization plane selectivity existing within the interior of the third polarization splitting/combining module 52, and is therefore output from the input/output terminal on the reflection light side.

Hence, the first signal light that is input into the third input/output terminal 52-3 of the third polarization splitting/combining module 52 as TE polarization is output from the second input/output terminal 52-2 of the third polarization splitting/combining module 52, propagates along the path $L_4$ as TE polarization, and passes through the third polarization plane conversion portion 56, where it is converted into TM polarization. The first signal light then propagates along the path $L_5$ and is re-input into the third polarization splitting/combining module 52 through the third input/output terminal 52-3. This time, the first signal light is input into the third input/output terminal 52-3 of the third polarization splitting/combining module 52 as TM polarization, and is therefore output from the fourth input/output terminal 52-4 on the opposite side of the third input/output terminal 52-3, and input into the sixth polarization-maintaining single-mode fiber 60 as TM polarization.

The path of the second signal light is as follows. Following output from the third input/output terminal 52-3 of the third polarization splitting/combining module 52, the second signal light propagates along the path $L_5$ as TM polarization and passes through the third polarization plane conversion portion 56 where it is converted into TE polarization. The second signal light then propagates along the path $L_4$ and is input into the second input/output terminal 52-2 of the third polarization splitting/combining module 52 as TE polarization.

The second signal light that is input into the second input/output terminal 52-2 of the third polarization splitting/combining module 52 as TE polarization is output from the third input/output terminal 52-3 of the third polarization splitting/combining module 52, propagates along the path $L_5$ as TE polarization, and passes through the third polarization plane conversion portion 56 where it is converted into TM polarization. The second signal light then propagates along the path $L_4$ and is re-input into the third polarization splitting/combining module 52 through the second input/output terminal 52-2. This time, the second signal light is input into the second input/output terminal 52-2 of the third polarization splitting/combining module 52 as TM polarization, and is therefore output from the first input/output terminal 52-1 on the opposite side of the second input/output terminal 52-2 as TM polarization, and input into the third polarization-maintaining single-mode fiber 22.

Hence, both the first signal light and second signal light are output from the third polarization splitting/combining module 52 as TM polarization, and then input into the sixth polarization-maintaining single-mode fiber 60 and third polarization-maintaining single-mode fiber 22, respectively. In other words, by providing the optical nonlinear control portion 50, although the first and second signal lights propagate along a longer path due to the propagation thereof through the fourth and fifth polarization-maintaining single-mode fibers 54 and 58, the polarization planes of the first and second signal lights remain as TM polarization upon input into and output from the optical nonlinear control portion 50. Accordingly, the optical switch of the second embodiment may be considered as an optical switch in which the path $L_3$ in the optical switch of the first embodiment, shown in FIG. 1, is replaced by the optical nonlinear control portion 50.

When the effective index of the slow axis of the fourth and fifth polarization-maintaining single-mode fibers 54 and 58 is $n_s$, the effective index of the fast axis is $n_f$, and the slow axis direction matches the polarization plane of the TM polarization, the optical path length of the path taken by the first signal light from output as TM polarization from the second input/output terminal 52-2 of the third polarization splitting/combining module 52 to input as TM polarization into the third input/output terminal 52-3 of the third polarization splitting/combining module 52 is obtained by adding together the paths along which the first signal light propagates in succession, or in other words according to the following equation (4).

$$n_s l_4 + n_f l_5 + n_f l_4 + n_s l_5 \quad (4)$$

Here, $l_4$ and $l_5$ are the lengths of the paths $L_4$ and $L_5$, respectively.

In other words, the total optical path length of the path taken by the first signal light from output from the second input/output terminal 52-2 of the third polarization splitting/combining module 52 to propagation along the path $L_4$ as TM polarization (optical path length=$n_s l_4$), propagation along the path $L_5$ as TE polarization (optical path length=$n_f l_5$), propagation along the path $L_4$ as TE polarization (optical path length=$n_f l_4$), and propagation along the path $L_5$ as TM polarization (optical path length=$n_s l_5$) is obtained from $n_s l_4 + n_f l_5 + n_f l_4 + n_s l_5$. Thus it can be seen that the first signal light propagates twice, once as TM polarization and once as TE polarization, along each of the path $L_4$ (fourth polarization-maintaining single-mode fiber 54) and the path $L_5$ (fifth polarization-maintaining single-mode fiber 58).

The second signal light may be considered in a similar manner to the first signal light in that the optical path length of the path taken by the second signal light from output as TM polarization from the third input/output terminal 52-3 of the third polarization splitting/combining module 52 to input as TM polarization into the second input/output terminal 52-2 of the third polarization splitting/combining module 52 is obtained likewise by adding together the paths along which the second signal light propagates in succession, or in other words according to the following equation (5).

$$n_s l_5 + n_f l_4 + n_f l_5 + n_s l_4 \quad (5)$$

Note that the control light propagates along an identical path and in an identical direction to the first signal light.

Comparing the above equations (4) and (5), it can be seen that the first, second, third, and fourth items in the equation (4) are equal to the fourth, third, second, and first items in the equation (5), respectively. In other words, it can be seen that the first signal light and second signal light propagate over an identical optical path length.

More specifically, when the control light is not input, the first signal light and second signal light are combined in phase in the third polarization splitting/combining module 52. When the control light is input, the optical Kerr effect is generated in the optical fiber loop, thereby altering the refractive index. As a result, the first signal light and second signal light propagate clockwise and counter-clockwise, respectively, through the optical fiber loop constituted by the paths $L_4$ and $L_5$ such that when the two signal lights are re-combined in the third polarization splitting/combining module 52, the respective phases thereof are offset.

By adjusting the intensity of the control light or the length of the fourth and fifth polarization-maintaining single-mode fibers 54 and 58 such that the phase shift amount $\phi$ equals $\pi$, the optical switch described above is realized. As shown by the above equation (1), the phase shift amount $\phi$ is commensurate with the total length of the optical fiber loop constituted by the paths $L_4$ and $L_5$. In other words, the optical switch of the present invention is constituted such that the first signal light and second signal light each propagate twice, once as TM polarization and once as TE polarization, along each of the paths $L_4$ and $L_5$, and therefore the path on which the optical Kerr effect occurs is increased in length substantially by the length of the path $L_4$ and the path $L_5$.

Description has been provided assuming that the length of the paths $L_4$ and $L_5$ is set much greater than the length of the other paths $L_1$, $L_2$, $L_3$, $L_6$, and $L_7$. In other words, it is assumed that the polarization-maintaining single-mode fibers constituting the paths $L_4$ and $L_5$ contribute mainly to generation of the phase shift amount $\phi$ based on the optical Kerr effect. However, the present invention is not limited to this. According to the equation (1), the phase shift amount $\phi$ is commensurate with the product of the length of the optical fiber constituting the optical fiber loop, and the intensity of the control light, and therefore, according to the optical switch of the present invention, the polarization-maintaining single-mode fiber length corresponding to the polarization-maintaining single-mode fibers that constitute the paths $L_4$ and $L_5$, which contribute mainly to generation of the phase shift amount $\phi$ based on the optical Kerr effect, need only behalf that of a conventional optical switch.

In other words, the length of the polarization-maintaining single-mode fibers constituting the paths $L_4$ and $L_5$ can be reduced, which is useful for making the optical switch more compact. Moreover, by reducing the length of the polarization-maintaining single-mode fibers constituting the paths $L_4$ and $L_5$, the effects of ambient temperature and so on are reduced, which is useful for stabilizing the operational state of the optical switch.

[Third Embodiment]

The structure and operation of an optical switch according to a third embodiment will now be described with reference to FIG. 6.

(Structure)

This optical switch comprises the first polarization splitting/combining module 10, the second polarization splitting/combining module 18, the first polarization-maintaining single-mode fiber 12, the second polarization-maintaining single-mode fiber 16, the first polarization plane conversion portion 14, the third polarization-maintaining single-mode fiber 22, a seventh polarization-maintaining single-mode fiber 82, and an optical nonlinear control portion 70. The optical band-pass filter 28 and optical circulator 30 are also preferably provided. In the following description, description of parts shared with the optical switch of the second embodiment described above has been omitted.

The optical nonlinear control portion 70 is connected to the third polarization-maintaining single-mode fiber 22 and seventh polarization-maintaining single-mode fiber 82, and comprises a third polarization splitting/combining module 72 having a first input/output terminal 72-1, a second input/output terminal 72-2, and a third input/output terminal 72-3, a fourth polarization splitting/combining module 80 having a first input/output terminal 80-1, a second input/output terminal 80-2, and a third input/output terminal 80-3, and fourth through sixth polarization-maintaining single-mode fibers 84, 74, 78. A second polarization plane conversion portion 76 is also provided.

The fourth polarization-maintaining single-mode fiber 84 is constituted such that one end thereof is connected to the second input/output terminal 72-2 of the third polarization splitting/combining module 72, on the opposite side of the first input/output terminal 72-1, and the other end thereof is connected to the second input/output terminal 80-2 of the fourth polarization splitting/combining module 80, on the opposite side of the first input/output terminal 80-1. The fifth polarization-maintaining single-mode fiber 74 is constituted such that one end thereof is provided with the second polarization plane conversion portion 76 for rotating the polarization plane 90 degrees, and the other end thereof is connected to the first input/output terminal 80-1 of the fourth polarization splitting/combining module 80. The sixth polarization-maintaining single-mode fiber 78 is constituted such that one end thereof is provided with the second polarization plane conversion portion 76 for rotating the polarization plane 90 degrees, and the other end thereof is connected to the third input/output terminal 72-3 of the third polarization splitting/combining module 72.

The other end of the third polarization-maintaining single-mode fiber 22 is connected to the first input/output terminal 72-1 of the third polarization splitting/combining module 72, and the other end of the seventh polarization-maintaining single-mode fiber 82 is connected to the third input/output terminal 80-3 of the fourth polarization splitting/combining module 80.

The reflection and transmission properties of the polarization plane selective reflection surfaces of the third and fourth polarization splitting/combining modules 72, 80 are identical to those of the polarization plane selective reflection surfaces of the polarization splitting/combining modules used in the second embodiment and soon described above, and therefore detailed description thereof has been omitted.

(Operation)

An operating principle of the optical switch according to the third embodiment will now be described with reference to FIG. 6. According to the optical switch of the third embodiment, the first signal light that propagates through the third polarization-maintaining single-mode fiber 22 in the CW direction is input into the first input/output terminal 72-1 of the third polarization splitting/combining module 72 in the optical nonlinear control portion 70, and the second signal light that propagates through the seventh polarization-maintaining single-mode fiber 82 in the CCW direction is input into the third input/output terminal 80-3 of the fourth polarization splitting/combining module 80 in the optical nonlinear control portion 70.

After propagating through the third polarization-maintaining single-mode fiber 22 as TM polarization, the first signal light is input into the optical nonlinear control portion 70. More specifically, the first signal light is input through the first input/output terminal 72-1 of the third polarization splitting/combining module 72, output from the second input/output terminal 72-2, input into the fourth polarization-maintaining single-mode fiber 84, propagates through the fourth polarization-maintaining single-mode fiber 84, is then input through the second input/output terminal 80-2 of the fourth polarization splitting/combining module 80, output from the first input/output terminal 80-1, and input into the fifth polarization-maintaining single-mode fiber 74.

Figure 6:
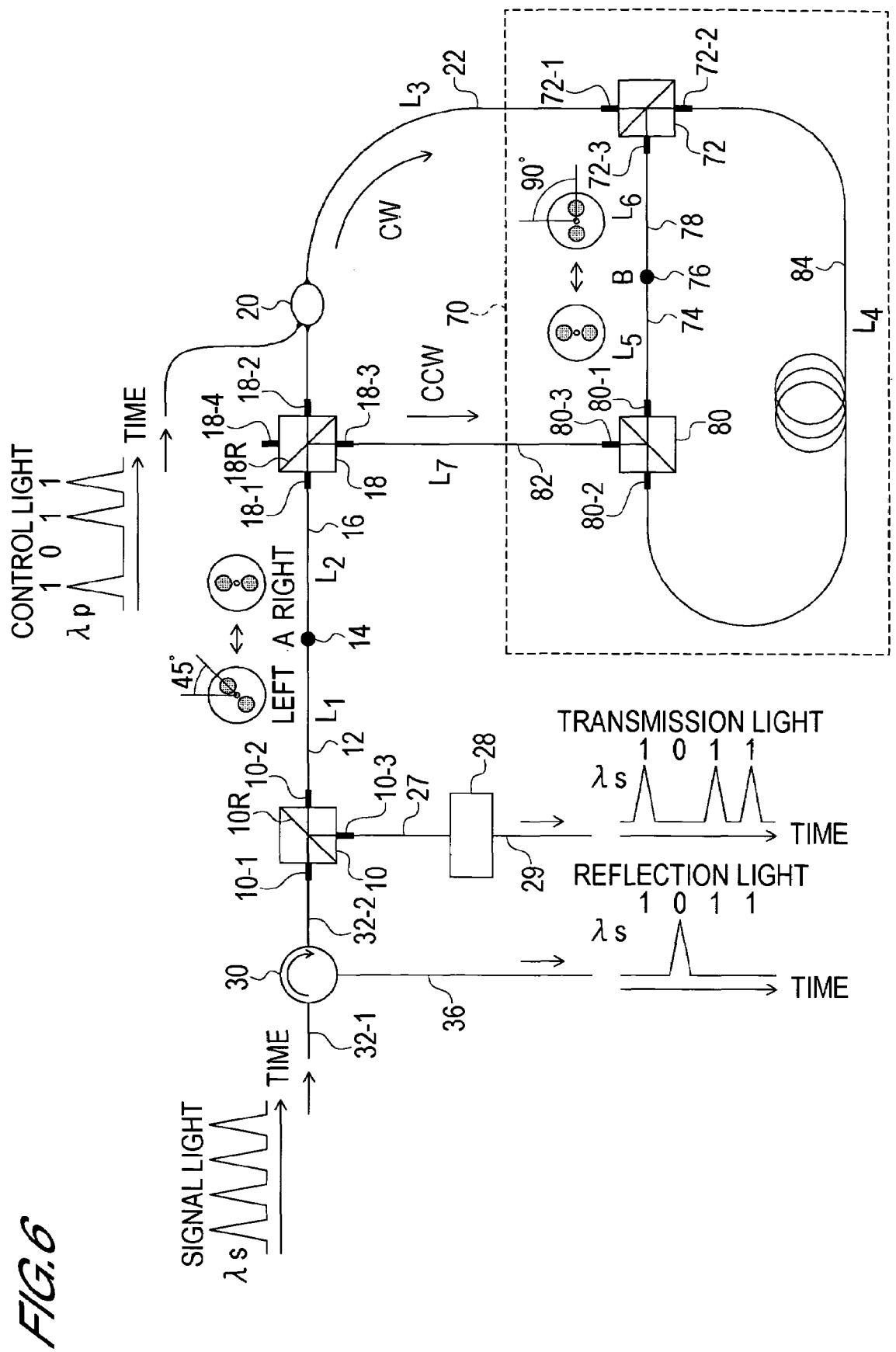
FIG. 6 is a block diagram of an optical switch according to a third embodiment.

The first signal light then propagates through the fifth polarization-maintaining single-mode fiber 74 as TM polarization to reach the second polarization plane conversion portion 76 provided at the one end of the fifth polarization-maintaining single-mode fiber 74, i.e. in the position shown by a point B in FIG. 6, where the polarization plane thereof is rotated 90 degrees. The first signal light then propagates through the sixth polarization-maintaining single-mode fiber 78 as TE polarization, and is input into the third input/output terminal 72-3 of the third polarization splitting/combining module 72. The first signal light is input into the third input/output terminal 72-3 of the third polarization splitting/combining module 72 as TE polarization, and is therefore output from the second input/output terminal 72-2 of the third polarization splitting/combining module 72 so as to propagate again through the fourth polarization-maintaining single-mode fiber 84 as TE polarization, and then input into the second input/output terminal 80-2 of the fourth polarization splitting/combining module 80. The first signal light is input through the second input/output terminal 80-2 as TE polarization, and is therefore output from the third input/output terminal 80-3 this time, and then input into the seventh polarization-maintaining single-mode fiber 82 as TE polarization.

Meanwhile, the second signal light propagates through the seventh polarization-maintaining single-mode fiber 82 as TE polarization, and is then input into the optical nonlinear control portion 70. More specifically, the second signal light is input through the third input/output terminal 80-3 of the fourth polarization splitting/combining module 80 as TE polarization, output from the second input/output terminal 80-2, input into the fourth polarization-maintaining single-mode fiber 84, propagates through the fourth polarization-maintaining single-mode fiber 84, is then input through the second input/output terminal 72-2 of the third polarization splitting/combining module 72, output from the third input/output terminal 72-3, and input into the sixth polarization-maintaining single-mode fiber 78.

The second signal light then propagates through the sixth polarization-maintaining single-mode fiber 78 to reach the second polarization plane conversion portion 76 provided at the one end of the sixth polarization-maintaining single-mode fiber 78, i.e. in the position shown by a point B in FIG. 6, where the polarization plane thereof is rotated 90 degrees. The second signal light is then input into the fifth polarization-maintaining single-mode fiber 74 as TM polarization, and after propagating through the fifth polarization-maintaining single-mode fiber 74, is input into the first input/output terminal 80-1 of the fourth polarization splitting/combining module 80. The second signal light is input into the first input/output terminal 80-1 as TM polarization, and is therefore output from the second input/output terminal 80-2 and input into the fourth polarization-maintaining single-mode fiber 84 as TM polarization. The second signal light then propagates again through the fourth polarization-maintaining single-mode fiber 84 as TM polarization, is then input into the second input/output terminal 72-2 of the third polarization splitting/combining module 72, output from the first input/output terminal 72-1 as TM polarization, and then input into the third polarization-maintaining single-mode fiber 22.

In other words, the first signal light is input into the seventh polarization-maintaining single-mode fiber 82 as TE polarization, and the second signal light is input into the third polarization-maintaining single-mode fiber 22 as TM polarization. Hence, by providing the optical nonlinear control portion 70, the first and second signal lights propagate along a longer path corresponding to the two propagations through the fourth polarization-maintaining single-mode fiber 84. In addition, when this optical switch is compared to the optical switch of the first embodiment shown in FIG. 1, a relationship of correspondence such as the following is established. The fourth polarization-maintaining single-mode fiber 26 and third polarization-maintaining single-mode fiber 22 of the optical switch according to the first embodiment shown in FIG. 1 correspond respectively to the seventh polarization-maintaining single-mode fiber 82 and third polarization-maintaining single-mode fiber 22 of the optical switch according to the third embodiment shown in FIG. 6. In other words, the optical switch of the third embodiment may be considered equivalent to an optical switch in which a part of the fourth polarization-maintaining single-mode fiber 26 and third polarization-maintaining single-mode fiber 22, which sandwich the second polarization plane conversion portion 24 in the optical switch of the first embodiment shown in FIG. 1, is replaced by the optical nonlinear control portion 70.

The optical switch of the third embodiment also differs from the optical switch of the second embodiment in the following point. The polarization splitting/combining module corresponding to the polarization splitting/combining module 52 in the optical switch of the second embodiment is provided in two locations, as the third and fourth polarization splitting/combining modules 72, 80, in the optical switch of the third embodiment, and therefore the polarization plane selectivity of the signal light to be switched is doubled, enabling polarization cross talk components to be removed more effectively than in the optical switch of the second embodiment. Moreover, the polarization plane selectivity of the polarization splitting/combining module is improved substantially even when the polarization plane selectivity of the polarization splitting/combining module is incomplete.

The first and second signal lights both propagate through the fourth polarization-maintaining single-mode fiber 84 twice. This is due to the fact that the polarization planes thereof are rotated 90 degrees by the second polarization plane conversion portion 76, and to the polarization plane selectivity of the third polarization splitting/combining module 72 and fourth polarization splitting/combining module 80. The reason for this is as follows.

The first signal light propagates through the third polarization-maintaining single-mode fiber 22 as TM polarization, and then propagates through the fourth polarization-maintaining single-mode fiber 84 as TM polarization via the third polarization splitting/combining module 72. The first signal light then propagates through the fifth polarization-maintaining single-mode fiber 74 via the fourth polarization splitting/combining module 80 as TM polarization, passes through the second polarization plane conversion portion 76 to be converted into TE polarization, and then propagates through the sixth polarization-maintaining single-mode fiber 78.

The first signal light is then input into the third input/output terminal 72-3 of the third polarization splitting/combining module 72 as TE polarization, and is therefore output from the second input/output terminal 72-2 so as to propagate again through the fourth polarization-maintaining single-mode fiber 84 as TE polarization. This time, the first signal light is input into the second input/output terminal 80-2 of the fourth polarization splitting/combining module 80 as TE polarization, and is therefore output from the third input/output terminal 80-3 so as to propagate through the seventh polarization-maintaining single-mode fiber 82 as TE polarization.

Hence, the first signal light first propagates through the fourth polarization-maintaining single-mode fiber 84 as TM polarization, and then as TE polarization, making a total of two propagations through the fourth polarization-maintaining single-mode fiber 84. Similarly, the second signal light first propagates through the fourth polarization-maintaining single-mode fiber 84 as TE polarization, and then as TM polarization, making a total of two propagations through the fourth polarization-maintaining single-mode fiber 84.

Similarly to the optical switch of the second embodiment, when the effective index of the slow axis of the fourth through sixth polarization-maintaining single-mode fibers is $n_s$, the effective index of the fast axis is $n_f$, and the slow axis direction matches the polarization plane of the TM polarization, the optical path length of the path taken by the first signal light from output from the second input/output terminal 72-2 of the third polarization splitting/combining module 72 to propagation through the fourth through sixth polarization-maintaining single-mode fibers and input into the second input/output terminal 80-2 of the fourth polarization splitting/combining module 80 is obtained in the following manner. The first signal light is output as TM polarization from the second input/output terminal 72-2 of the third polarization splitting/combining module 72.

When the lengths of the fourth polarization-maintaining single-mode fiber 84, fifth polarization-maintaining single-mode fiber 74, and sixth polarization-maintaining single-mode fiber 78 are set as $l_4$ (path $L_4$), $l_5$ (path $L_5$), and $l_6$ (path $L_6$), respectively, the optical path length is obtained by adding together the paths along which the first signal light propagates in succession, or in other words according to the following equation (6).

$$n_s l_4 + n_s l_5 + n_f l_6 + n_f l_4 \qquad (6)$$

In other words, the first signal light propagates through the fourth polarization-maintaining single-mode fiber 84 as TM polarization, and therefore the optical path length is $n_s l_4$, and the first signal light propagates through the fifth polarization-maintaining single-mode fiber 74 as TM polarization, and therefore the optical path length is $n_s l_5$. Here, the polarization plane of the first signal light is rotated 90 degrees by the second polarization plane conversion portion 76, and therefore the first signal light propagates through the sixth polarization-maintaining single-mode fiber 78 as TE polarization. Hence, the optical path length is $n_f l_6$. The first signal light propagates through the fourth polarization-maintaining single-mode fiber 84 for the second time as TE polarization, and therefore the optical path length is $n_f l_4$.

Meanwhile, the second signal light is output as TE polarization from the second input/output terminal 80-2 of the fourth polarization splitting/combining module 80. The optical path length of the path taken by the second signal light from output from the second input/output terminal 80-2 of the fourth polarization splitting/combining module 80 to propagation through the fourth through sixth polarization-maintaining single-mode fibers and input into the second input/output terminal 72-2 of the third polarization splitting/combining module 72 is obtained by adding together the paths along which the second signal light propagates in succession, or in other words according to the following equation (7).

$$n_f l_4 + n_f l_6 + n_s l_5 + n_s l_4 \qquad (7)$$

Note that also in the optical switch of the third embodiment, the control light propagates along the same path and in the same direction as the first signal light.

It can be seen from a comparison of the equations (6) and (7) that the first, second, third, and fourth items in the equation (6) are equal to the fourth, third, second, and first items in the equation (7), respectively. In other words, the first signal light and second signal light propagate over the same optical path length.

In other words, when the first signal light is subjected to mutual phase modulation based on the control light, the first signal light reaches the second input/output terminal 72-2 of the third polarization splitting/combining module 72 later than when the control light is not applied. As a result, when the first and second signal lights pass through the optical nonlinear control portion 70 and are combined in the second polarization splitting/combining module 18, the respective phases thereof are offset.

By adjusting the intensity of the control light or the length of the fourth polarization-maintaining single-mode fiber 84 such that the phase shift amount $\phi$ equals $\pi$, the optical switch is realized. As shown by the above equation (1), the phase shift amount $\phi$ is commensurate with the length of the fourth polarization-maintaining single-mode fiber 84 constituting the path $L_4$. In other words, the optical switch of the third embodiment is constituted such that propagation along the path $L_4$ is performed a total of two times, once as TM polarization and once as TE polarization, and therefore the path on which the optical Kerr effect occurs is increased in length substantially by the length of the path $L_4$.

Description has been provided assuming that the length of the path $L_4$ is set much greater than the length of the other paths $L_1$, $L_2$, $L_3$, $L_5$, $L_6$, and $L_7$. In other words, it is assumed that the fourth polarization-maintaining single-mode fiber 84 constituting the path $L_4$ contributes mainly to generation of the phase shift amount $\phi$ based on the optical Kerr effect. However, the present invention is not limited to this. According to the equation (1), the phase shift amount $\phi$ is commensurate with the product of the length of the optical fiber constituting the optical fiber loop and the intensity of the control light, and therefore, according to the optical switch of the third embodiment, the polarization-maintaining single-mode fiber length corresponding to the fourth polarization-maintaining single-mode fiber 84 constituting the path $L_4$, which contributes mainly to generation of the phase shift amount $\phi$ based on the optical Kerr effect, need only be half that of a conventional optical switch.

In other words, the length of the fourth polarization-maintaining single-mode fiber 84 constituting the path $L_4$ can be reduced, which is useful for making the optical switch more compact. Moreover, by reducing the length of the polarization-maintaining single-mode fiber constituting the path $L_4$, the effects of ambient temperature and so on are reduced, which is useful for stabilizing the operational state of the optical switch.

What is claimed is:

1. An optical switch comprising:
    first, second, third, and fourth polarization-maintaining single-mode fibers, each having first and second ends;
    an optical coupler in said third polarization-maintaining single-mode fiber, between the first and second ends thereof;
    a first polarization splitting/combining module having a first input/output terminal into which a signal light is input, a second input/output terminal on a side of said first polarization splitting/combining module opposite said first input/output terminal, to which the first end of the first polarization-maintaining single-mode fiber is connected, and a third input/output terminal for outputting a switched signal light;
    a second polarization splitting/combining module having a first input/output terminal to which the second end of the second polarization-maintaining single-mode fiber is connected, a second input/output terminal on a side of said second polarization splitting/combining module opposite said first input/output terminal, to which the first end of the third polarization-maintaining single-mode fiber is connected, and a third input/output terminal to which the first end of the fourth polarization-maintaining single-mode fiber is connected;
    a first polarization plane conversion portion connecting the second end of said first polarization-maintaining single-mode fiber and the first end of said second polarization-maintaining single-mode fiber; and
    a second polarization plane conversion portion connecting the second end of said third polarization-maintaining single-mode fiber and the second end of said fourth polarization-maintaining single-mode fiber.

2. The optical switch according to claim 1, wherein said first polarization plane conversion portion is formed by fusing said first polarization-maintaining single-mode fiber and said second polarization-maintaining single-mode fiber such that an optical axis of said first polarization-maintaining single-mode fiber and an optical axis of said second polarization-maintaining single-mode fiber form an angle of about 45 degrees in relation to each other.

3. The optical switch according to claim 2, further comprising an output optical fiber having a first end and having a second end that is connected to said third input/output terminal of said first polarization splitting/combining module, and an optical band-pass filter that is connected to the first end of said output optical fiber.

4. The optical switch according to claim 2, further comprising an input optical fiber having a first end and having a second end that is connected to said first input/output terminal of said first polarization splitting/combining module, and an optical circulator that is connected to the first end of said input optical fiber.

5. The optical switch according to claim 1, wherein said second polarization plane conversion portion is formed by fusing said third polarization-maintaining single-mode fiber and said fourth polarization-maintaining single-mode fiber such that an optical axis of said third polarization-maintaining single-mode fiber and an optical axis of said fourth polarization-maintaining single-mode fiber form an angle of about 90 degrees in relation to each other.

6. The optical switch according to claim 5, further comprising an input optical fiber having a first end and having a second end that is connected to said third input/output terminal of said first polarization splitting/combining module, and an optical circulator that is connected to the first end of said output optical fiber.

7. The optical switch according to claim 5, further comprising an output optical fiber having a first end and having a second end that is connected to said third input/output terminal of said first polarization splitting/combining module, and an optical band-pass filter that is connected to the first end of said output optical fiber.

8. The optical switch according to claim 1, further comprising an output optical fiber having a first end and having a second end that is connected to said third input/output terminal of said first polarization splitting/combining module, and an optical band-pass filter that is connected to the first end of said output optical fiber.

9. The optical switch according to claim 1, further comprising an input optical fiber having a first end and having a second end that is connected to said first input/output terminal of said first polarization splitting/combining module, and an optical circulator that is connected to the first end of said input optical fiber.

10. The optical switch according to claim 1, wherein said first polarization plane conversion portion is formed by fusing said first polarization-maintaining single-mode fiber and said second polarization-maintaining single-mode fiber such that an optical axis of said first polarization-maintaining single-mode fiber and an optical axis of said second polarization-maintaining single-mode fiber form an angle of about 45 degrees in relation to each other, and said second polarization plane conversion portion is formed by fusing said third polarization-maintaining single-mode fiber and said fourth polarization-maintaining single-mode fiber such that an optical axis of said third polarization-maintaining single-mode fiber and an optical axis of said fourth polarization-maintaining single-mode fiber form an angle of about 90 degrees in relation to each other.

11. The optical switch according to claim 10, further comprising an output optical fiber having a first end and having a second end that is connected to said third input/output terminal of said first polarization splitting/combining module, and an optical band-pass filter that is connected to the first end of said output optical fiber.

12. The optical switch according to claim 10, further comprising an input optical fiber having a first end and having a second end that is connected to said first input/output terminal of said first polarization splitting/combining module, and an optical circulator that is connected to the first end of said input optical fiber.

13. The optical switch according to claim 1, wherein said second polarization splitting/combining module additionally has a fourth input/output terminal on a side of said second polarization splitting/combining module opposite said third input/output terminal, for outputting a polarization cross talk component.

* * * * *